(12) United States Patent
Watanabe et al.

(10) Patent No.: US 7,212,649 B2
(45) Date of Patent: May 1, 2007

(54) ENCODER AND ENCODING METHOD FOR ELECTRONIC WATERMARK, DECODER AND DECODING METHOD FOR ELECTRONIC WATERMARK, ENCODING AND DECODING PROGRAM FOR ELECTRONIC WATERMARK, AND RECORDING MEDIUM FOR RECORDING SUCH PROGRAM

(75) Inventors: Toshio Watanabe, Tokyo (JP); Takayuki Nishimura, Tottori (JP); Seiji Nagao, Tokyo (JP); Kazumitsu Watanabe, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 762 days.

(21) Appl. No.: 10/272,857

(22) Filed: Oct. 18, 2002

(65) Prior Publication Data

US 2003/0133591 A1    Jul. 17, 2003

(30) Foreign Application Priority Data

Oct. 22, 2001   (JP)   ............................. 2001-324184
Jun. 18, 2002   (JP)   ............................. 2002-177268

(51) Int. Cl.
*G06K 9/00* (2006.01)
(52) U.S. Cl. ...................... 382/100; 713/176
(58) Field of Classification Search ............... 382/100, 382/232; 380/210, 252, 287, 54; 713/176
See application file for complete search history.

(56) References Cited

U.S. PATENT DOCUMENTS

| | | | |
|---|---|---|---|
| 5,764,278 A | 6/1998 | Nagao | |
| 5,898,457 A | 4/1999 | Nagao et al. | |
| 6,185,312 B1 * | 2/2001 | Nakamura et al. | 382/100 |
| 6,600,828 B1 * | 7/2003 | Kawamura | 382/100 |
| 6,768,807 B1 * | 7/2004 | Muratani | 382/100 |
| 2001/0055070 A1 | 12/2001 | Watanabe | |
| 2002/0178368 A1 * | 11/2002 | Yin et al. | 713/186 |
| 2003/0133591 A1 | 7/2003 | Watanabe et al. | |

OTHER PUBLICATIONS

U.S. Appl. No. 10/272,857 filed Oct. 18, 2002, Watanabe et al.
U.S. Appl. No. 10/646,754, filed Aug. 25, 2003, Kodama et al.
U.S. Appl. No. 10/647,337, filed Aug. 26, 2003, Sakuyama et al.
U.S. Appl. No. 10/272,857, filed Oct. 18, 2002, Watanabe et al.
U.S. Appl. No. 10/659,349, filed Sep. 11, 2003, Nomizu et al.
U.S. Appl. No. 10/682,121, filed Oct. 10, 2003, Hara et al.
U.S. Appl. No. 10/691,623 filed Oct. 24, 2003, Hara et al.

(Continued)

*Primary Examiner*—Vikkram Bali
*Assistant Examiner*—Anand Bhatnager
(74) *Attorney, Agent, or Firm*—Oblon, Spivak, McClelland, Maier & Neustadt, P.C.

(57) ABSTRACT

Disclosed is an encoder for forming electronic watermark information which allows detecting tampering of a digital content based on an electronic watermark embedded in the digital content, and limiting said tampered part. This encoder comprises means for dividing a subject digital content into multiple blocks, and means for independently forming the electronic watermark information in the individual blocks.

38 Claims, 20 Drawing Sheets

OTHER PUBLICATIONS

U.S. Appl. No. 10/716,463, Filed Nov. 20, 2003, Kodama et al.
U.S. Appl. No. 10/703,509, filed Nov. 10, 2003, Nomizu et al.
U.S. Appl. No. 10/717,090, filed Nov. 28, 2003, Kodama et al.
U.S. Appl. No. 10/717,674, filed Nov. 21, 2003, Sakuyama et al.
U.S. Appl. No. 10/716,429, filed Nov. 20, 2003, Nomizu et al.
U.S. Appl. No. 11/222,867, filed Sep. 12, 2005, Sugiura et al.
Holliman, M. et al. "Counterfeiting attacks on oblivious block-wise independent invisible watermarking schemes", IEEE Transactions on Image Processing IEEE USA, vol. 9, No. 3, Mar. 2000, pp. 432-441.
Langelaar, G. C. et al. "Watermarking digital image and video data. A state-of-the-art overview", IEEE Signal Processing Magazine IEEE USA, vol. 17, No. 5, Sep. 2000, pp. 20-46.
Ping Wah Wong et al., "Secret and public key authentication watermarking schemes that resist vector quantization attack", Proceedings of the SPIE - The International Society for Optical Engineering SPIE-INT. Soc. OPT. ENG USA, vol. 3971, 2000, pp. 417-427.
Celik, M. U. et al., "A hierarchical Image authentication watermark with improved localization and security", Proceedings 2001 International Conference on Image Processing., ICIP 2001., Thessaloniki, Greece, Oct. 7-10, 2001, International conference on Image Processing, New York, NY, IEEE, US, Oct. 7, 2001, pp. 502-505.
International Business Machines Corporation, "Watermark data-hiding for print out by printer firmware", Research Disclosure, Mason Publications, Hampshire, GB, vol. 427, No. 96, Nov. 1999.
Menezes, A. J. et al., "Handbook of Applied Cryptography, passage", CRC Press Series on Discrete Mathematics and Its Applications, Boca Raton, FL, CRC PRess, US, 1997, pp. 33, 358-368.

* cited by examiner

IMAGE DATA

BLOCK

Lb : BLACK RUN LENGTH
Lw : WHITE RUN LENGTH

CHANGEABLE REGION

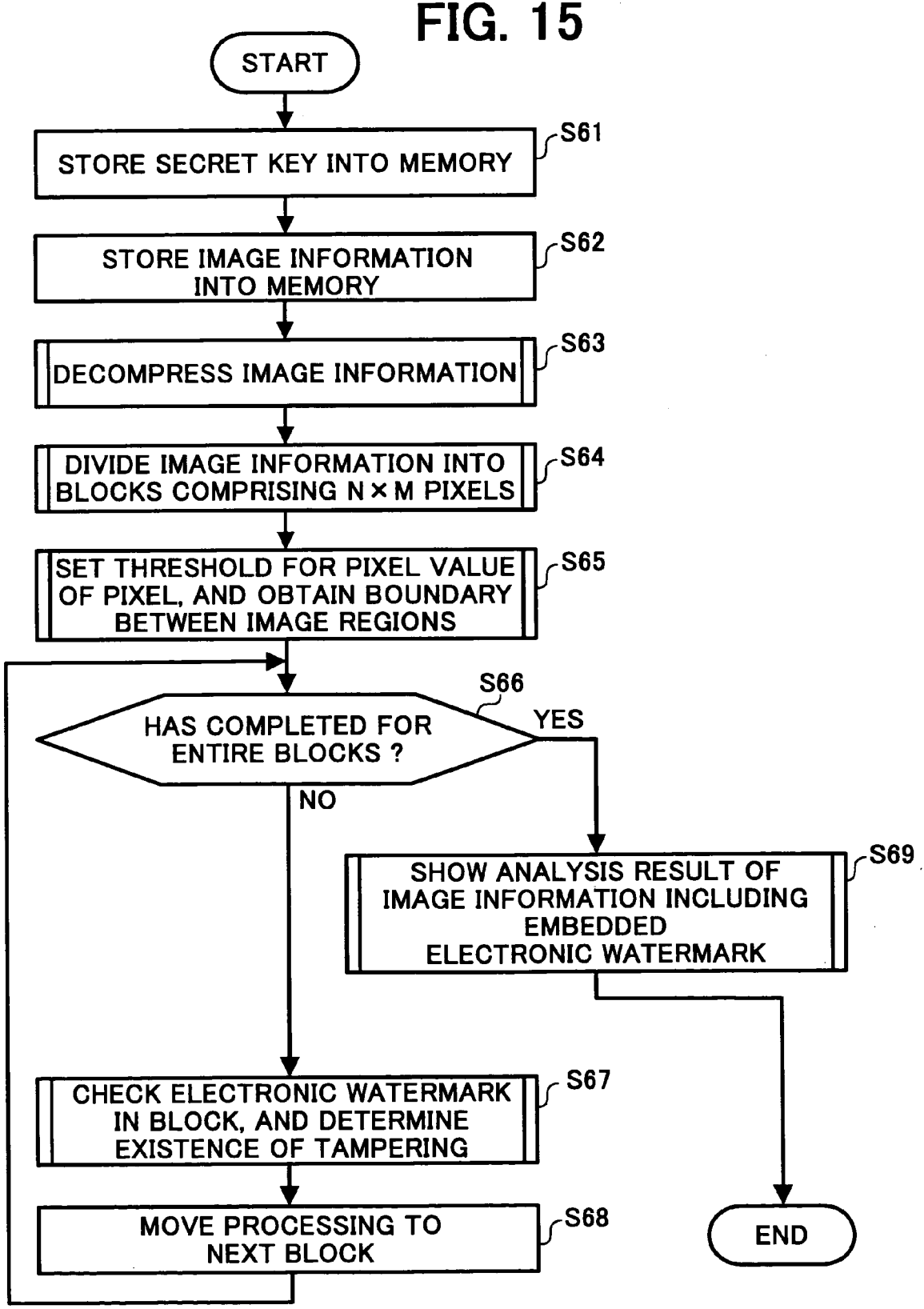

ENCODER AND ENCODING METHOD FOR ELECTRONIC WATERMARK, DECODER AND DECODING METHOD FOR ELECTRONIC WATERMARK, ENCODING AND DECODING PROGRAM FOR ELECTRONIC WATERMARK, AND RECORDING MEDIUM FOR RECORDING SUCH PROGRAM

BACKGROUND OF THE INVENTION

1. Field of the Invention

The present invention relates to a method and an apparatus for encoding to generate electronic watermark information, and embedding an electronic watermark into a digital content, a method and an apparatus for reading and decoding the embedded electronic watermark so as to detect tampering, a program for encoding and decoding, and a recording medium for recording this program so as to be read by an information processing apparatus.

2. Description of the Prior Art

Information of a digital content is easily copied on an information processing apparatus such as a computer without degradation. In addition, the information of the digital content is easily tampered by rewriting and the like. Further, the information of the digital content can be easily transmitted on a communication line. As a result, the information of the digital content is copied illegally by a simple process or operation, and then reused without permission. Also, since it is easy to partially tamper the information of the digital content, especially image information pictured by a digital camera, the information is not used as a photographic evidence as a photograph taken by a silver film camera is used.

Methods such as electronic watermark and data hiding are known as methods for preventing the tampering. The electronic watermark is a method for adding information, which is hardly recognized visually when the information is reproduced normally, to a digital content such as digital image information.

This electronic watermark technology is roughly divided into two categories. The first category is technology which directly embeds electronic watermark data into a sampled value of content data. The second category technology which embeds electronic watermark data into a frequency component. With the technology for embedding the electronic watermark data into the sampled value of the content data, though the embedded electronic watermark data tend to be lost when the content data is processed or compressed, the embedding is simple. On the other hand, with the technology for embedding the electronic watermark data into the frequency component, though the electronic watermark is robust against processing and compressing the content data, the processing for embedding and extracting the electronic watermark data is complicated.

A method for uniformly scattering and embedding the electronic watermark data on the entire image, and a method for inserting the electronic watermark only at a remarkable part are known as the technologies for embedding the electronic watermark data into the sampled value of the content data.

A method for adding the electronic watermark data to data in the frequency domain by applying a frequency transform such as fast Fourier transform (FFT), discrete cosine transform (DCT), and wavelet transform to a digital content is known as the technology for embedding the electronic watermark data into the frequency component. When the electronic watermark to be added is such a small quantity that the data do not change original data largely, the data are decoded by inverse frequency transform such that an original image is not visually deteriorated, and simultaneously, the data are transmitted while the electronic watermark information is visually hidden.

Though a computer or a scanner is used to embed the electronic watermark into a digital content, an original data or a content subject to embedding the electronic watermark is necessary. Thus, the embedding the electronic watermark into the digital content using a computer or a scanner is secondary processing which allows tampering before creating the digital content to which the electronic watermark is embedded.

However, when a binary image such as black/white binary image is used as the image information to which the electronic watermark is embedded, a Loss-Less image compression method (such as MH, MR, and MMR which are G3 and G4 standards of the International Telecommunication Union (ITU-T)) which can restore the original image without generating a loss is recommended by the International Telecommunication Union (ITU-T), and this image compression method is generally used. A Lossy image compression technology which may lose detailed information comes to be often used for a multi-valued image such as a color image and a grayscale image while emphasis is placed on data compression for storage rather than avoiding more or less degradation of the image quality. Image compression technology such as JPEG and MPEG using frequency transform based on the discrete cosine transform (DCT) corresponds this technology.

Thus, since the embedded electronic watermark degrades as the image compression degrades the image quality in an application which prevents tampering the multi-valued image, capability for detecting tampering an image decreases, and consequently, there is such a problem that a sufficient function for preventing tampering is not realized.

SUMMARY OF THE INVENTION

The present invention orients to solving the problems of the prior art. The present invention embeds an electronic watermark into a digital content of a multi-valued image and a binary image pictured by a digital camera so as to detect tampering an image content tampered by a third party even when the tampering is minute. Namely, a purpose of the present invention is to provide a pictured image with a capability as a photographic evidence, for example, and is to provide an encoding method and an encoder for electronic watermark, a decoding method and a decoder for electronic watermark, and an encoding/decoding program for an electronic watermark which store and recover both the electronic watermark information, and tampered information with hardly loosing them even when non-compression, Loss-Less image compression, or Lossy compression is applied to a subject image, and a recording medium for recording this program.

To attain the purpose, since an encoder for forming electronic watermark information according to a first aspect of the present invention which detects tampering in a digital content, limits a part of the tampering based on the electronic watermark embedded in the digital content, and comprises means for dividing a subject digital content into multiple blocks, and means for independently forming electronic watermark information in the individual blocks, the electronic watermark information which detects tampering of the digital content based on the embedded electronic watermark, and limits the tampered part to a block is formed.

According to second and third aspects of the present invention, since the encoder for electronic watermark according to the first aspect further comprises means for dividing the blocks to be divided such that a region of the block overlaps blocks neighboring on the upper, lower, left, and right sides in place of the means for dividing the digital content into multiple blocks, means for associating the electronic watermark information formed by the means for independently forming electronic watermark information in the individual blocks with each other by means of the overlap region between the blocks, and means for arbitrarily changing the size of the multiple divided blocks, and the overlap regions between the blocks in place of the means for dividing the digital content into multiple blocks, the electronic watermark which detects an exchange between the blocks as tampering is formed, and the blocks are divided into an arbitrary size.

According to fourth and fifth aspects of the present invention, since the means for independently forming electronic watermark information in the blocks forms the electronic watermark information by means of a hash function (randomizing) which uses plurality of data of a digital content embedded with an electronic watermark immediately before, a secret key, the date of executing the process, an apparatus production number, and the like as seed data, and further, the number of successive pixels in individual regions of the digital content embedded with a digital watermark immediately before is used as the data of the digital content embedded with a digital watermark immediately before for forming the electronic watermark in the encoder for electronic watermark according to the first aspect, electronic watermark information with high security is formed.

According to sixth to eighth aspects of the present invention, since odd/even of a pixel value of individual pixels in a multi-valued image of the digital content is matched using odd/even of an integer of a result of the randomizing by the hash function (randomizing) used for the means for forming electronic watermark information, odd/even of the number of successive pixels in individual regions in a binary image of the digital content is matched using odd/even of an integer of a result of the randomizing by the hash function, and regions are formed based on a threshold for pixel values of individual pixels in a multi-valued image of the digital content, and odd/even of the number of successive pixels in the individual regions is matched using odd/even of an integer of a result of the randomizing of the hash function in the encoder for electronic watermark according to the first aspect, the electronic watermark information is formed in multi-valued and binary images.

According to ninth to eleventh aspects of the present invention, since the encoder for electronic watermark according to the first aspect further comprises means for embedding the electronic watermark while positions for applying an electronic watermark are skipped in the digital content, and even further comprises means for skipping positions for applying the electronic watermark in the digital content, and means for embedding the electronic watermark at a boundary between successive pixels in the digital content, and means for arbitrarily changing the positions for skipping the electronic watermark is added to the means for skipping positions for applying the electronic watermark in the digital content, electronic watermark information which restrains degradation of the digital content, and arbitrarily selects a range of the degradation is embedded.

According to a twelfth aspect of the present invention, since information indicating that the electronic watermark is embedded is recorded in a file header of the digital content when the digital content with the embedded electronic watermark is created by the encoder for electronic watermark according to the first aspect, and then is recorded on a recording medium, the digital content after the processing is easily handled.

According to a thirteenth aspect of the present invention, since the encoder for electronic watermark according to the first aspect is added to a digital camera, a subject is pictured as a digital content by imaging means, and the digital content is recorded on a recording medium while the electronic watermark is embedded, tampering the digital content pictured by the digital camera is disabled, and evidence capability of the pictured image is secured.

Since an encoding method for electronic watermark for forming electronic watermark information according to a fourteenth aspect of the present invention which detects tampering in a digital content, and limits a part of the tampering based on the electronic watermark embedded in the digital content, and comprises the steps of dividing a subject digital content into multiple blocks, and independently forming electronic watermark information in the individual blocks, the electronic watermark information which detects tampering of the digital content based on the embedded electronic watermark, and limits the tampered part to a block is formed.

According to fifteenth and sixteenth aspects of the present invention, since the encoding method for electronic watermark according to the fourteenth aspect further comprises steps of dividing the blocks to be divided such that a region of the block overlaps blocks neighboring on the upper, lower, left, and right sides corresponding to the means for dividing the digital content into multiple blocks, associating the electronic watermark information formed by the means for independently forming electronic watermark information in the individual blocks each other by means of the overlap region between the blocks, and arbitrarily changing the size of the multiple divided blocks, and the overlap regions between the blocks, the electronic watermark which detects an exchange between the blocks as tampering is formed, and the blocks are divided into an arbitrary size.

According to seventeenth and eighteenth aspects of the present invention, since electronic watermark information is formed independently in said blocks by means of a hash function (randomizing) which uses plurality of data of a digital content embedded with an electronic watermark immediately before, a secret key, the date of executing the process, an apparatus production number, and the like as seed data, and further, the number of successive pixels in individual regions of the digital content embedded with a digital watermark immediately before is used as the data of the digital content embedded with a digital watermark immediately before used as the seed data for the hash function (randomizing) in the encoding method for electronic watermark according to the fourteenth aspect, electronic watermark information with high security is formed.

According to nineteenth to twenty first aspects of the present invention, since odd/even of a pixel value of individual pixels in a multi-valued image of the digital content is matched using odd/even of an integer of a result of the randomizing by the hash function (randomizing) used for forming electronic watermark information, odd/even of the number of successive pixels in individual regions in a binary image of the digital content is matched using odd/even of an integer of a result of the randomizing by the hash function, and regions are formed based on a threshold for pixel values of individual pixels in a multi-valued image of the digital content, and odd/even of the number of successive pixels in the individual regions is matched using odd/even of an integer of a result of the randomizing of the hash function in the encoding method for electronic watermark according to the fourteenth aspect, the electronic watermark information is formed in multi-valued and binary images.

According to twenty second to twenty fourth aspects of the present invention, since the encoding method for electronic watermark according to the fourteenth aspect further comprises the steps of embedding the electronic watermark while positions for applying an electronic watermark are skipped in the digital content, and even further comprises the steps of skipping positions for applying the electronic watermark in the digital content, and embedding the electronic watermark at a boundary between successive pixels in the digital content, and the positions for embedding the electronic watermark are arbitrarily changed by skipping positions for applying the electronic watermark in the digital content, electronic watermark information which restrains degradation of the digital content, and arbitrarily selects a range of the degradation is embedded.

According to a twenty fifth aspect of the present invention, since information indicating that an electronic watermark is embedded is recorded in a file header of the digital content when the digital content with the embedded electronic watermark is created by the encoding method for electronic watermark according to the fourteenth aspect, and then the digital content is recorded on a recording medium, the digital content after the processing is easily handled.

Since a decoder for electronic watermark according to twenty sixth and twenty seventh aspects of the present invention which reads out and decodes the electronic watermark embedded in a digital content by the encoder for electronic watermark according to the first aspect comprises means for reading out the electronic watermark information individually formed for the multiple divided blocks, means for decoding the electronic watermark information, means for detecting an existence of a tampered part in the digital content based on the result from the decoding means, and means for showing a block including the tampered part detected by the means for detecting an existence of a tampered part in the digital content as a color inversion pattern, a black fill pattern, a white fill pattern, a color fill pattern other than the black and white fills, and the like, the electronic watermark embedded in the digital content is read out and decoded, and an existence of a tampered part in the digital content is detected, and the detected tampered part is made as visually identifiable.

Since a decoding method for electronic watermark according to twenty eighth and twenty ninth aspects of the present invention which reads out and decodes the electronic watermark embedded in a digital content by the encoding method for electronic watermark according to the fourteenth aspect comprises the steps of reading out the electronic watermark information individually for the multiple divided blocks, decoding the electronic watermark information, detecting an existence of a tampered part in the digital content, and showing a block including the tampered part detected based on reading out and decoding the electronic watermark information in the digital content as a color inversion pattern, a black fill pattern, a white fill pattern, a color fill other than the black and white fills, and the like, the electronic watermark embedded in the digital content is read out and decoded, and an existence of the tampered part in the digital content is detected, and the tampered part is made as visually identifiable.

An encoding and decoding program for electronic watermark according to thirtieth aspect of the present invention encodes to form electronic watermark information for detecting tampering in a digital content, and limiting a part of the tampering based on the electronic watermark embedded in the digital content, and decodes the electronic watermark for showing a tampered part when the tampered part is detected, on an information processing apparatus, the information processing apparatus executes a function for dividing a subject digital content into multiple blocks, a function for independently forming electronic watermark information in the individual blocks, a function for reading out the electronic watermark information individually for the multiple divided blocks, and a function for decoding the electronic watermark information, and then the information processing apparatus detects a tempered part, limits the tampered part to a block, and shows the tampered part for the individual blocks.

According to thirty first and thirty second aspects of the present invention, since the information processing apparatus executes a function for dividing the blocks to be divided such that a region of the blocks overlaps blocks neighboring on the upper, lower, left, and right sides, a function for associating the electronic watermark information formed by the function for independently forming electronic watermark information in the individual blocks with each other by means of the overlap region between the blocks, and a function for arbitrarily changing the size of the multiple divided blocks, and the overlap region between the blocks when the function for dividing the digital content into multiple blocks is executed in the encoding and decoding program for electronic watermark according to the thirtieth aspect, the electronic watermark for detecting an exchange between the blocks as tampering is formed, and the size of the block to be detected is arbitrarily changed.

According to thirty third and thirty fourth aspects of the present invention, since the information processing apparatus executes a function for independently forming electronic watermark information in the blocks to form the electronic watermark information by means of a hash function (randomizing) which uses plurality of data of a digital content embedded with an electronic watermark immediately before, a secret key, the data of executing the process, an apparatus production number, and the like as seed data, and the number of successive pixels in individual regions of the digital content embedded with a digital watermark immediately before is used as the data of the digital content embedded with a digital watermark immediately before in the encoding and decoding program for electronic watermark according to the thirtieth aspect, electronic watermark information with high security is formed.

According to thirty fifth to thirty seventh aspects of the present invention, since odd/even of a pixel value of individual pixels in a multi-valued image of the digital content is matched using odd/even of an integer of a result of the randomizing by the hash function (randomizing) used when the function for forming electronic watermark information is executed by the information processing apparatus, odd/even of the number of successive pixels in individual regions in a binary image of the digital content is matched using odd/even of an integer of a result of the randomizing by the hash function, and regions are formed based on a threshold for pixel values of individual pixels in a multi-valued image of the digital content, and odd/even of the number of successive pixels in the individual regions is matched using odd/even of an integer of a result of the randomizing of the hash function in the encoding and decoding program for electronic watermark according to the thirtieth aspect, the electronic watermark information is formed in multi-valued and binary images.

According to thirty eighth to fortieth aspects of the present invention, since the information processing apparatus executes a function for embedding the electronic watermark while positions for applying an electronic watermark are skipped in the digital content, further executes a function for skipping positions for applying the electronic watermark in the digital content, and a function for embedding the electronic watermark at a boundary between successive pixels in the digital content, and even further executes a function for arbitrarily changing the positions for skipping the electronic watermark in the function for skipping positions for applying the electronic watermark in the digital content in the encoding and decoding program for electronic watermark according to the thirtieth aspect, the electronic watermark information is embedded while degradation of the digital content is restrained, and a range of the degradation is arbitrarily selected.

According to a forty first aspect of the present invention, since the information processing apparatus executes a function for detecting a tampered part in the digital content based on the decoded electronic watermark information, and a function for showing a block including the tampered part as a color inversion pattern, a black fill pattern, a white fill pattern, a color fill pattern other than the black and white fills, and the like in the function for decoding the electronic watermark information in the encoding and decoding program for electronic watermark according to the thirtieth aspect, the tampered part is made visually identifiable.

Since a recording medium according to a forty second aspect of the present invention records the encoding and decoding program for electronic watermark according to the thirtieth aspect so as to be readable for functioning on an information processing apparatus, it is possible to embed electronic watermark information into a digital content on another apparatus through the recording medium, and simultaneously, a tampered part is detected by reading and decoding the electronic watermark.

BRIEF DESCRIPTION OF THE DRAWINGS

FIG. 15 is a flowchart showing processing for reading an electronic watermark in an image, decoding it, and detecting tampering according to the third embodiment.

DETAILED DESCRIPTION OF PREFERRED EMBODIMENTS

Figure 1:
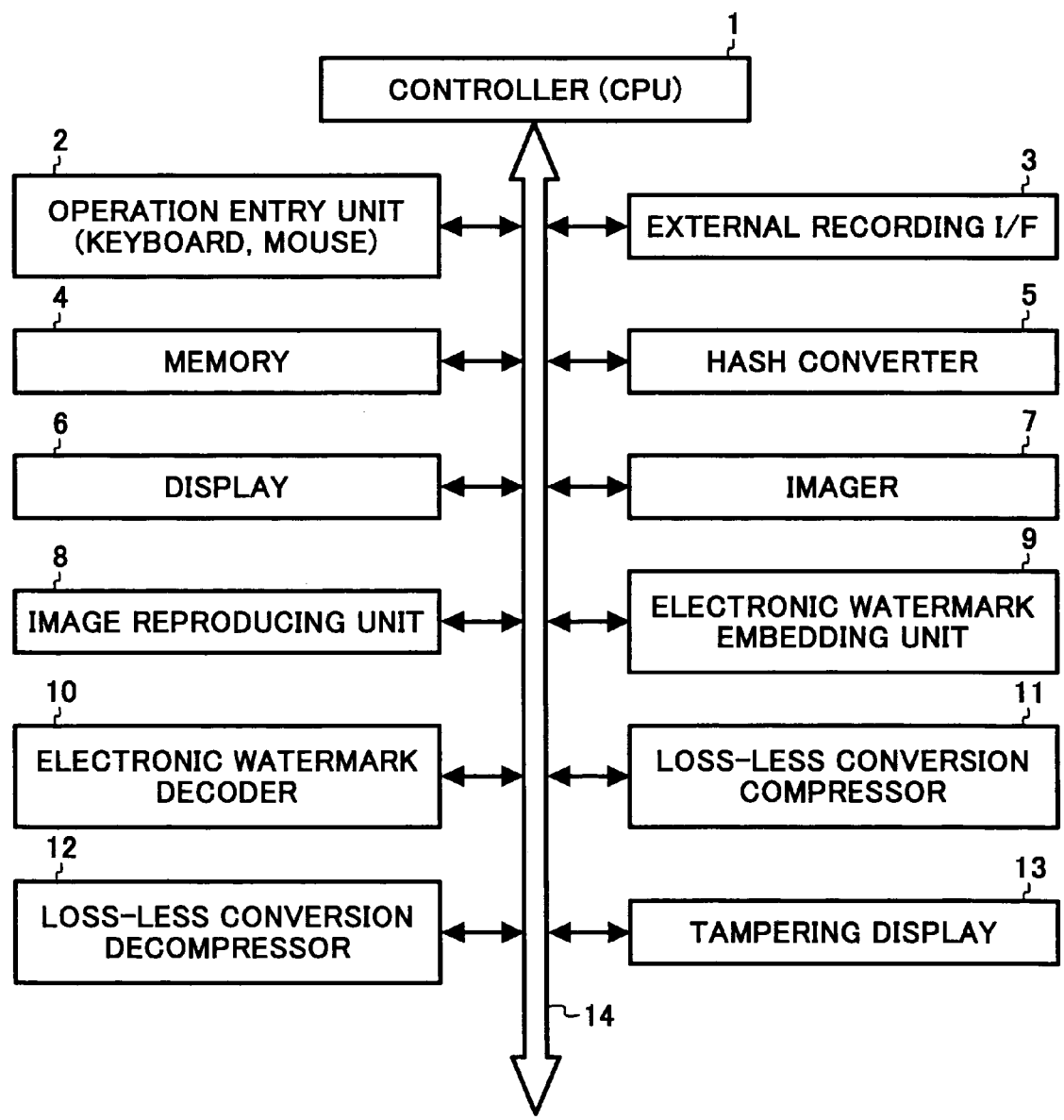
FIG. 1 is a block diagram showing a schematic constitution of an encoder/decoder for electronic watermark of a first embodiment of the present invention.

In FIG. 1, 1 is a controller for controlling an entire apparatus, 2 is an operation entry unit such as a keyboard and a mouse, 3 is an external recording interface (referred to as I/F hereafter) with which a unit such as an external recording medium is connected, 4 is a memory, 5 is a hash converter, 6 is a display, 7 is an imager, 8 is an image reproducing unit, 9 is an electronic watermark embedding unit, 10 is an electronic watermark decoder, 11 is a Loss-Less conversion compressor, 12 is a Loss-Less conversion de-compressor, 13 is a tampering display for displaying a detected tampered part, and 14 is a bus for connecting the individual parts with each other. I/F's required between the individual parts and the bus 14 are not shown in FIG. 1.

The controller 1 is a microcomputer (comprises a CPU, a ROM, and a RAM, and is simply referred to as CPU) which controls an entire operation and functions of a decoder and an encoder for electronic watermark, and software processing on this CPU in the controller 1 realizes the individual functions of the imager 7, the electronic watermark embedding unit 9, and the Loss-Less conversion compressor 11 for conducting processing for picturing an image, and the image reproduction unit 8, the Loss-Less conversion de-compressor 12, the electronic watermark decoder 10, and the tampering display 13 for displaying a detected tampered part (presenting an indication such as inversion) for conducting processing for reproducing the image.

The operation entry unit 2 servers for entering various types of operation instructions, function selection commands, edit data, and the like, and corresponds to a keyboard, a mouse, a touch panel, and the like. Especially, the operation entry unit 2 is used for entering a secret key for encrypting in order to embed electric watermark information, and for decrypting the encrypted electronic watermark.

The operation entry unit 2 also servers as display selection means, and an operator operates the operation entry unit 2 to change the display 6 to a desired display state. For example, an entry through a key operation can superimpose the result of decoding the electronic watermark on image information of the input image, or can select either one of them for display.

The external recording I/F 3 is an I/F for extracting the image information on an image obtained by the imager 7, image information including an electronic watermark compressed by the Loss-Less conversion compressor 11, data of a tampered part detected by the electronic watermark decoder 10 and the like to the outside of the decoder, and records them on a recording medium (such as a floppy disk (FD) and an optical magnetic disk (OMD)) for storage. The external recording I/F 3 may be connected with a recording medium for recording the software program whose processing is executed on the controller 1.

The memory 4 is recording means for storing image information on the image obtained by the imager 7, image information which includes the embedded electronic watermark, and is reproduced by the image reproduction unit 8, image information which is Loss-Less-converted and compressed, and the like, and corresponds to a RAM or a hard disk with a large capacity.

The hash converter 5 is used to encrypt image information when the electronic watermark embedding unit 9 embeds electronic watermark information, and is also used to decrypt the image information when the electronic watermark decoder 10 decodes the electronic watermark information.

The imager 7 is image information entry means for reading in image information through scanning a set photography or form. The imager 7 corresponds to an image scanner, a scan optical system for a digital camera, a CCD, and the like which are publicly known, and comprise a sensor and its drive circuit.

The image reproduction unit 8 controls to reproduce the image information stored in a recording medium accessed through the external recording I/F 3, and the like.

The electronic watermark embedding unit 9 uses the hash converter 5 to encrypt the image information read by the imager 7, and stored in the memory 4 so as to apply the processing for embedding an electronic watermark into the image information.

The electronic watermark decoder 10 extracts the electronic watermark from image information including an embedded electronic watermark, and determines an existence of tampering of the image based on whether the extracted electronic watermark can be decoded or not.

The Loss-Less conversion compressor 11 is used only when it is necessary to compress (Loss-Less convert) image information including an embedded electronic watermark without degrading the information. The Loss-Less conversion de-compressor 12 decompresses and decodes the image information which is compressed with Loss-Less conversion after the electronic watermark is embedded. Since the compression/decompression processing is known art, the detailed description is not provided.

The tampering display 13 includes a function for displaying a corresponding part as an inversion or a black fill when it is determined that image information is tampered based on the result of the decoding in the electronic watermark decoder 10.

Figure 2A:
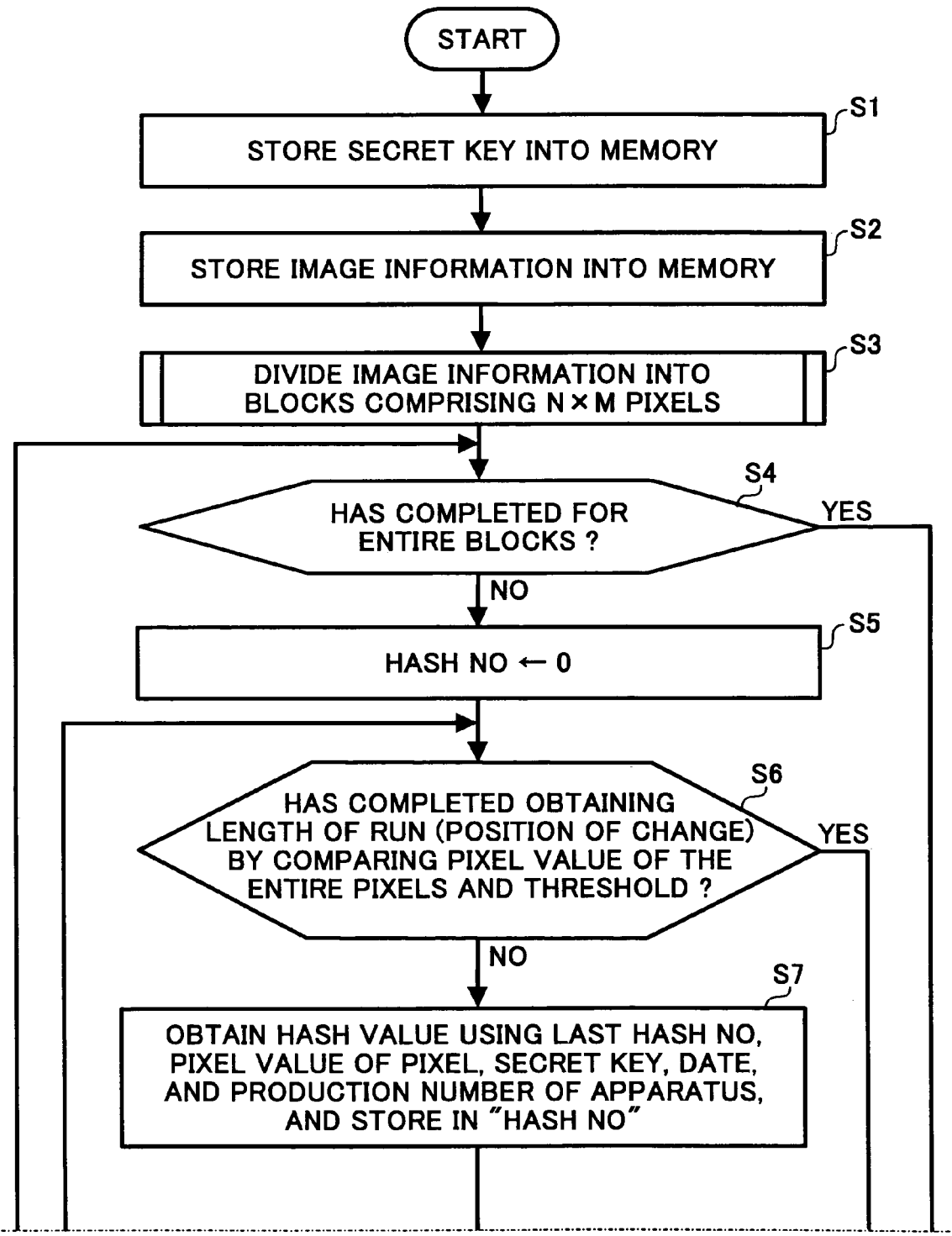
FIGS. 2A and 2B are flowcharts showing processing according to the first embodiment which divides an image into blocks, and embeds an electronic watermark.
Figure 2B:
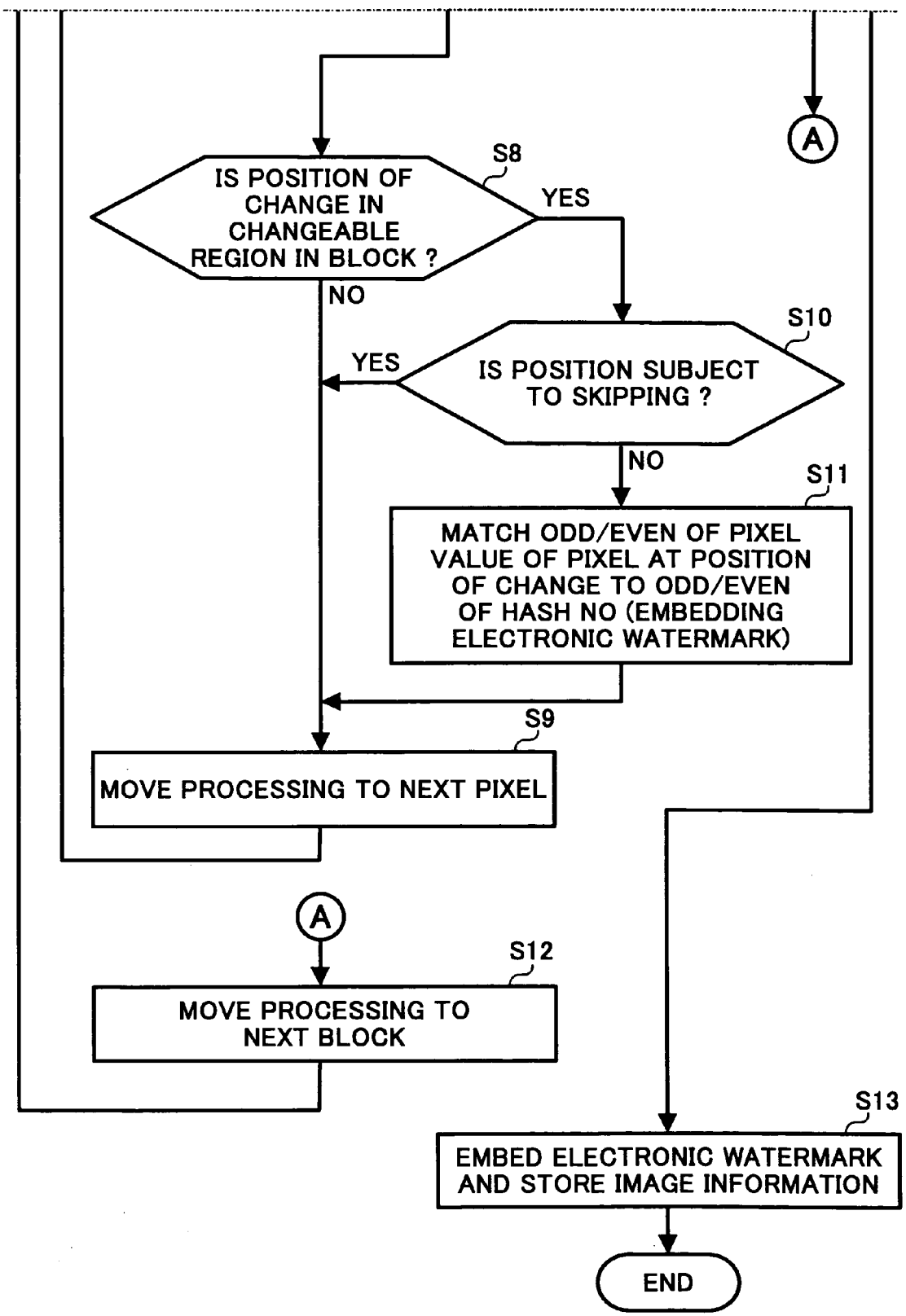

FIGS. 2A and 2B are flowcharts showing an encoding method for an electronic watermark of the first embodiment, and showing processing which divides an image into blocks, and embeds an electronic watermark when the electronic watermark is embedded into image information as a digital content. The following section describes a case where processing for embedding an electronic watermark into an image taken by a digital camera is applied to a multi-valued image to which Loss-Less compressing/decompressing can be applied.

The controller 1 stores an encryption key, which is entered from the operation entry unit 2, and is used for embedding an electronic watermark, into the memory 4 (S1). Also, the controller 1 stores image information taken by the imager 7 into the memory 4 (S2). The controller 1 divides the image information into blocks with the same size comprising n×m pixels (S3). At this time, the controller 1 divides such that the block partially overlaps the upper, lower, left, and right blocks.

The controller 1 checks whether the entire image information is divided into blocks (S4), and if the processing for the entire blocks has not completed yet (No in S4), the controller initializes "Hash NO" in which a hash value obtained using a hash function (S5).

The controller 1 checks a luminance value or a color difference value (a pixel value) pixel by pixel from the upper left to the lower right in the same block, and compares it with a predetermined threshold of a predetermined luminance value or color difference value so as to obtain the length (the position of change) of a run (a row) of successive luminance values or color difference values of the pixels. Also, the controller 1 checks whether the length (the position of change) of the run (the row) of the successive luminance values or color difference values are obtained for the entire pixels (S6), and if the processing has not completed yet (No in S6), a hash value is obtained while the last HashNO, the luminance value or color difference value of the pixel, the secret key, the date of the processing, and the production number of the apparatus are used as seeds for the hash function, and is stored in "Hash NO" (S7). It is possible to set which item is selected from these seed data for the hash function (a combination of multiple items is possible), and to set the size of the blocks to be divided, and the quantity of the overlap between the neighboring blocks thorough operating the operation entry unit 2.

Since the size of the block where an electronic watermark is embedded is inversely proportional to the level of the degradation of an original image, arbitrarily changing the size of the divided blocks can selects a range of the image degradation. Also it is possible to restrain the image degradation due to embedding an electronic watermark by comparing the predetermined value as the threshold with a difference in pixel value between the pixel to be checked in Step S6 and its neighboring pixel, and then, embedding the electronic watermark at a part (boundary) where a difference in neighboring pixel values is large.

The controller 1 determines whether the position of change in the run length in Step S6 is in a changeable region in the block (S8), and if the position is not in a changeable region (No in S8), the controller 1 moves to processing for the next pixel (S9), and then returns to Step S6. If the position is in a changeable region (Yes in S8), the controller 1 checks whether the position of the pixel corresponds to a position subject to skipping (S10), and moves to Step S9 if so (Yes in S10). This prevents image degradation while skipping positions where an electronic watermark is embedded since the image degradation increases if an electronic watermark is embedded to entire corresponding pixels. The positions for skipping are set to (multiples of a certain integer)th pixel positions or positions where the luminance value or the color difference value changes largely, for example. It is possible to arbitrarily change the degree of skipping the position for embedding an electronic watermark. When the degree of skipping is large, the degradation of an image decreases. Thus, since it is necessary to increase the area required for decoding an electronic watermark so as to increase reliability of an electronic watermark for detecting tampering, the area of a gray zone (indicating tampering) for identifying a tampered position increases (precision for identifying a tampered position decreases).

If the position does not correspond to a position subject to skipping in Step S10 (No in S10), the controller 1 matches the odd/even of the luminance value or the color difference value of the pixel at the position of change to the odd/even of "Hash NO" obtained in Step S7 (S11). This process (Step S11) conducts the processing for embedding an electronic watermark. Then the controller 1 moves to the processing of Step S9.

If the processing has completed for the entire pixels in the block in Step S6 (Yes in S6), the controller 1 moves the processing to the next block (S12), and then, moves the processing to Step S4. At this time, the selection of the block in the subject image information moves from the upper left to the lower right as of the run of the pixels.

If it is confirmed that the processing for the entire blocks has completed in Step S4, the controller 1 records the image information including the embedded electronic watermark in the memory 4 or the recording medium (S13), and then, completes the processing. If information indicating that processing for preventing tampering with an electronic watermark has been applied to image information is added to a file header when the digital content including the embedded electronic watermark is recorded on the recording medium (since it is difficult to visually confirm whether an electronic watermark has been embedded or not when the image information is displayed), managing and handling the content becomes easy. It is possible to further apply electronic watermark data to the processing described above.

Figures 3, 4:
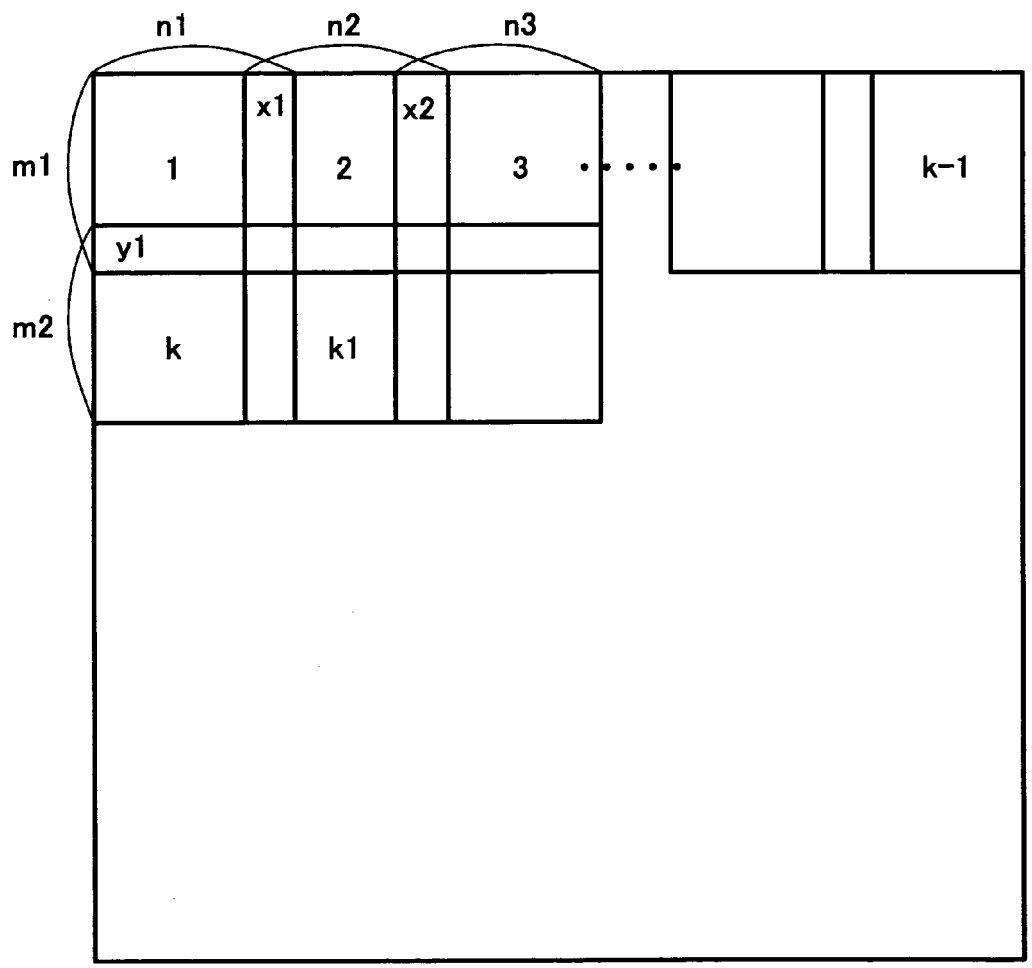
FIG. 3 is a view showing an example where an image is divided into blocks with the same size overlapping one another.
FIG. 4 is a view showing a part of pixel values of pixels in an original multi-valued image, and the part in the multi-valued image after an electronic watermark is embedded.

FIG. 3 is a view exemplifying the overlaps of the blocks divided by the processing which divides an image into blocks with the same size (n×m pixels) shown in Step S3 in FIG. 2A. As shown in FIG. 3, a changeable region in a first block (block size: n1×m1) in Step S8 is (n1×m1), a changeable region in a second block (n2×m2) is a region excluding an overlap with the first block (x1×m1), and a changeable region in a (k+1)th block (n2×m2) is a region excluding an overlap with the second block (n2×y1) and an overlap with the kth block (x1×m2). Namely, a changeable region in a block selected later excludes regions which are changed in blocks selected before. With this selection, since the blocks are associated with one another by generating electronic watermark information including the overlapping regions among the individual blocks, it is possible to detect a replacement between blocks.

The following section describes an example of embedding an electronic watermark shown in Step S11 in FIG. 2B. FIG. 4 shows a part of pixel values (luminance value: Y) of pixels in an original multi-valued image and those after an electronic watermark is embedded. In this example, since the position of a pixel Yk of interest which is checked for whether an electronic watermark can be embedded or not is in a changeable region, and simultaneously is not a position subject to skip (corresponding to a position with a large change in luminance value (a position of change)), the luminance value "12" of the pixel Yk is changed to an odd number of "11" based on a hash value (such as an odd number) stored in "Hash NO" in Step S7 shown in FIG. 2A.

If the position of the pixel of interest is not in a changeable region, or is at a position subject to skip, the processing for embedding an electronic watermark is not conducted.

Figure 5A:
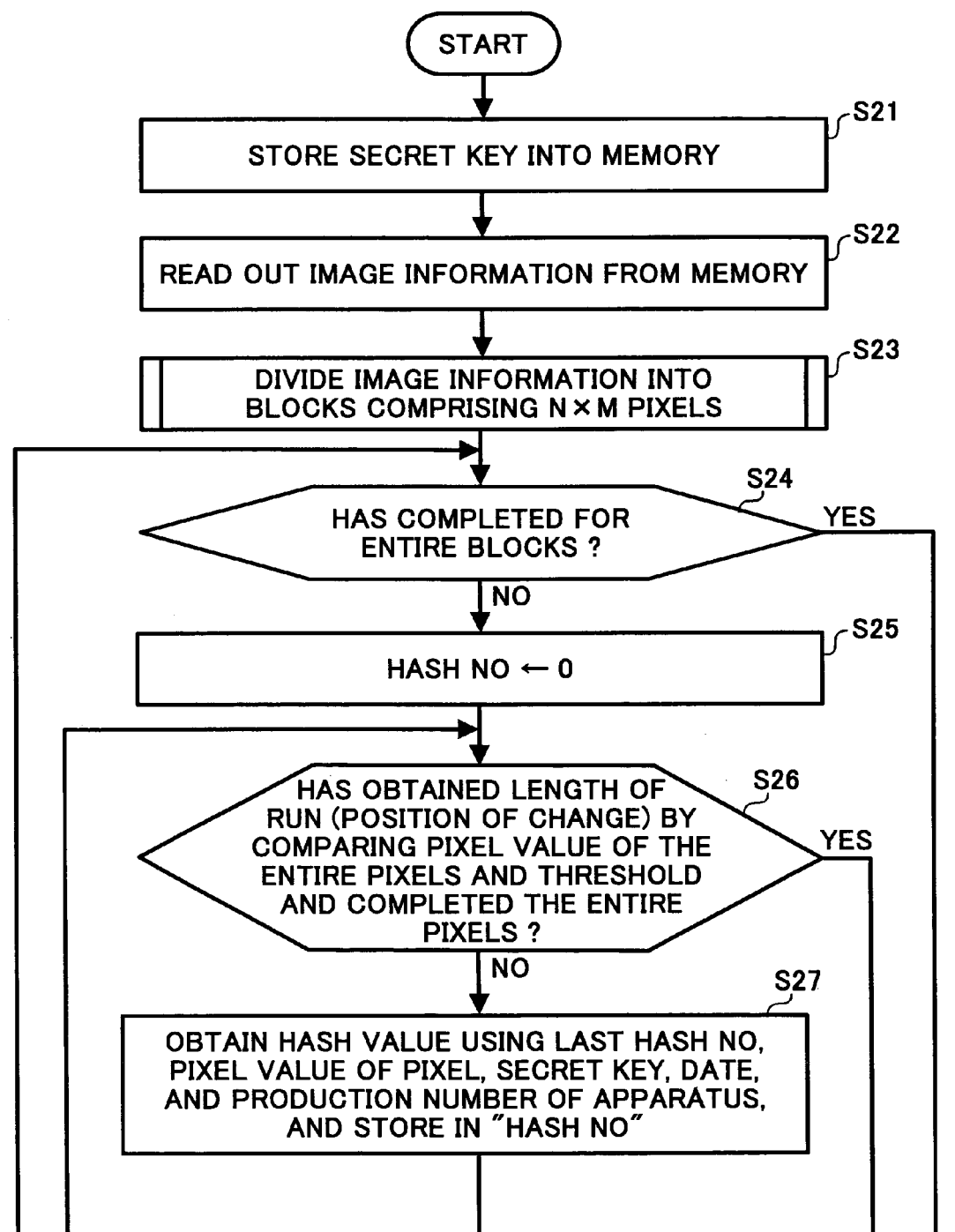
FIGS. 5A and 5B are flowcharts showing processing for reading an electronic watermark in an image, decoding it, and detecting tampering according to the first embodiment.
Figure 5B:
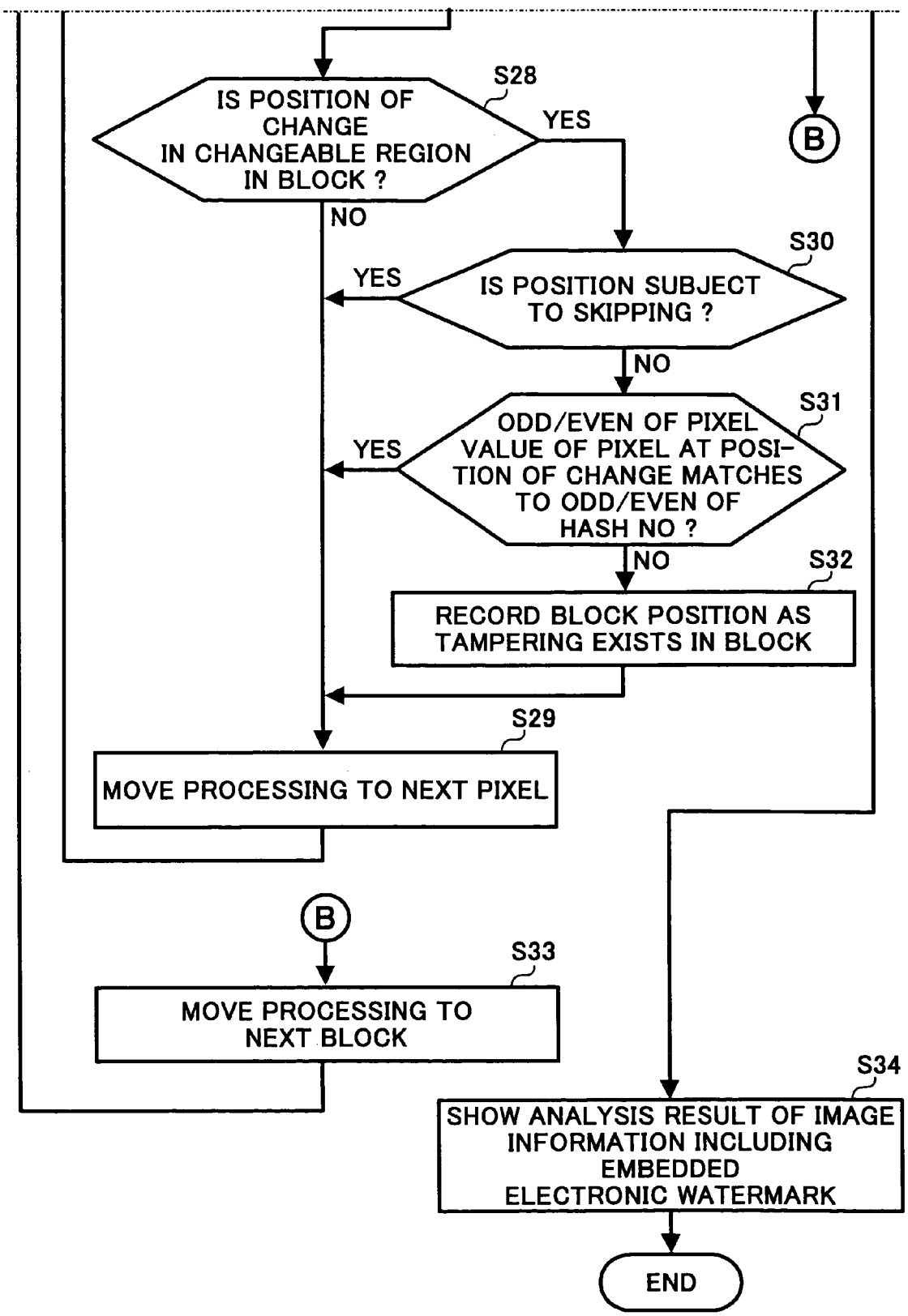

FIGS. 5A and 5B are flowcharts showing processing for reading an electronic watermark, decoding it, and detecting tampering during reproducing an image in the first embodiment. First, the controller 1 stores an encryption key, which is used for encryption for embedding an electronic watermark, and is entered from the operation entry unit 2 shown in FIG. 1, into the memory (S21), and reads out image information including an embedded electronic watermark from the memory 4 (S22). At this time, when the image information is stored while it is compressed, the controller 1 uses the Loss-Less conversion de-compressor 12 to decompress the image information. Further, the controller 1 divides the image information into blocks with the same size of n×m (S23). At this time, the controller 1 conducts the division such that the divided blocks partially overlap neighboring upper, lower, left, and right blocks.

The controller 1 checks whether the entire image information is divided into blocks (S24), and if the processing for the entire blocks has not completed yet (No in S24), the controller 1 initializes "Hash NO" for storing the hash value (S25).

The controller 1 checks a luminance value or a color difference value pixel by pixel from the upper left to the lower right in the same block, and compares it with a predetermined threshold so as to obtain the length (the position of change) of a run (a row) of successive luminance values or color difference values of the pixels. Also, the controller 1 checks whether the check of the pixel value has completed for the entire pixels (S26), and if the processing has not completed yet (No in S26), a hash value is obtained while the last Hash NO, the luminance value or color difference value of the pixel, the secret key, the date of the processing, and the production number of the apparatus are used as seeds for a hash function, and is stored in "Hash NO" (S27).

The controller 1 determines whether the position of change in the run length in Step S26 is in a changeable region in the block (S28), and if the position is not in a changeable region (No in S28), the controller 1 moves to processing for the next pixel (S29), and then returns to step S26. If the position is in a changeable region (Yes in S28), the controller 1 checks whether the position of the pixel corresponds to a position subject to skipping (S30), and moves to Step S29 if so (Yes in S30).

If the position does not correspond to a position subject to skipping in Step S30 (No in S30), the controller 1 confirms whether the odd/even of the luminance value or the color difference value of a pixel at the position of change matches the odd/even of "Hash NO" obtained in Step S27 (S31). With this confirmation, the reproducibility of the embedded electronic watermark is checked.

If the odd/even matches in Step S31 (Yes in S31), the controller 1 determines that tampering does not exist, and moves to Step S29. If the odd/even does not match (No in S31), the controller 1 determines that there exist tampering, records the position of the corresponding block (S32), and moves to Step S29.

If the processing has completed for the entire pixels in the block in Step S26 (Yes in S26), the controller 1 moves the processing to the next block (S33), and then, returns to Step S24. At this time, the selection of the block in the subject image information moves from the upper left to the lower right as of the run of the pixels.

If the controller confirms that the processing has completed for the entire blocks in Step S24 (Yes in S24), the controller 1 shows a result of analysis of the image information including the embedded electronic watermark (S34), and finishes the processing.

The controller 1 shows the block recorded in Step S32 as a color inversion pattern, a black fill pattern, a white fill pattern, a color fill pattern other than the black and white fills, or the like on the display 13 based on this analysis result so as to inform the tampering. If tampering was not detected, the controller 1 may show a state such as the date of applying the electronic watermark based on the information such as the date used as the seed data for the hash function when the electronic watermark information is encrypted.

As described above, an existence of tampering a digital content is detected, and the tampering is shown by storing multi-valued image information including an electronic watermark after it is Loss-Less compressed or non-compressed, reading out the Loss-Less compressed or non-compressed image information, decoding, and checking the electronic watermark in the image information.

Figure 6:
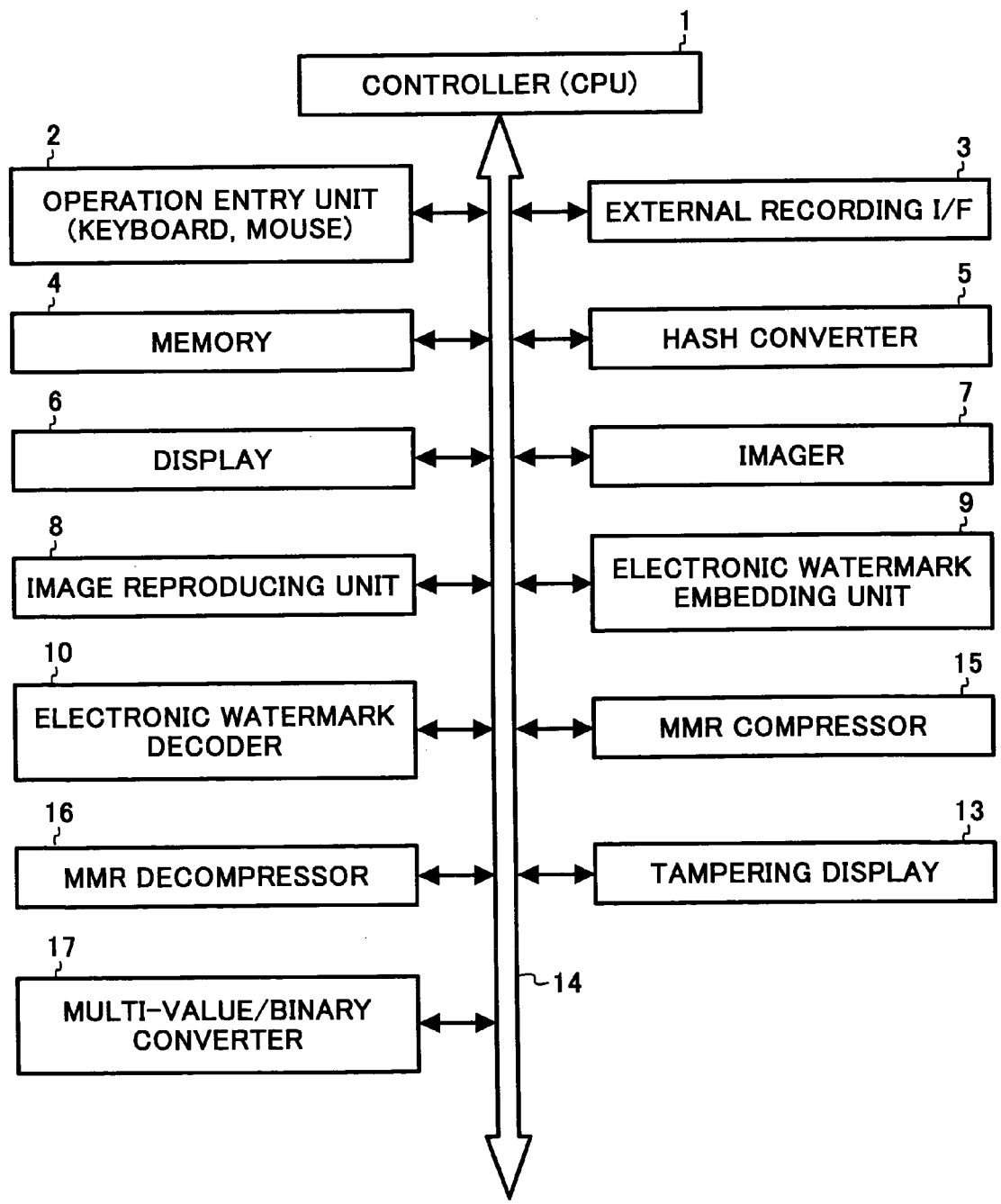
FIG. 6 is a block diagram showing a schematic constitution of an encoder/decoder for electronic watermark of a second embodiment of the present invention.

FIG. 6 is a block diagram showing a schematic constitution of an encoder and a decoder for electronic watermark according to a second embodiment of the present invention. This constitution corresponds to the constitution elements in the encoder and the decoder for electronic watermark described while referring to FIG. 1 in the first embodiment described above, and the same numerals are assigned to constitution elements virtually having a similar function. In FIG. 6, 1 is a controller, 2 is an operation entry unit, 3 is an external recording I/F, 4 is a memory, 5 is a hash converter, 6 is a display, 7 is an imager, 8 is an image reproduction unit, 9 is an electronic watermark embedding unit, 10 is an electronic watermark decoder, 13 is a tampering display, 14 is a bus, 15 is an MMR compressor, 16 is an MMR de-compressor, and 17 is a multi-value/binary converter.

The MMR compressor 15 in FIG. 6 uses MMR compression to compress an image including an electronic watermark embedded by the electronic watermark embedding unit 9. The MMR de-compressor 16 decompresses to decode the MMR-compressed image including the electronic watermark embedded by the MMR compressor 15.

The multi-value/binary converter 17 binarizes read image information from a multi-valued image to a binary image at a predetermined resolution, thereby obtaining image information comprising white dots and black dots, and a publicly-known technology can be applied to the conversion.

Figure 7A:
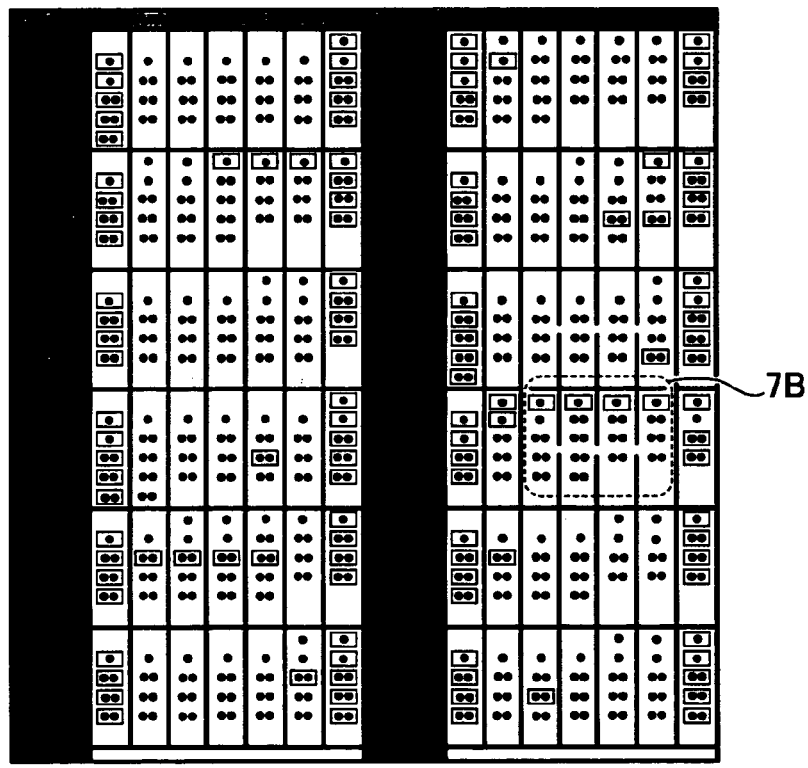
FIGS. 7A and 7B are views showing a binary image converted from an image pictured by an imager, and a partially enlarged image of this binary image, respectively.
Figure 7B:
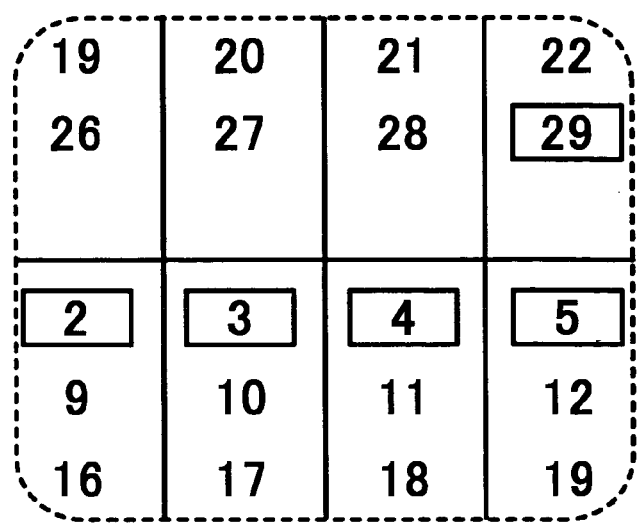
Figure 8A:
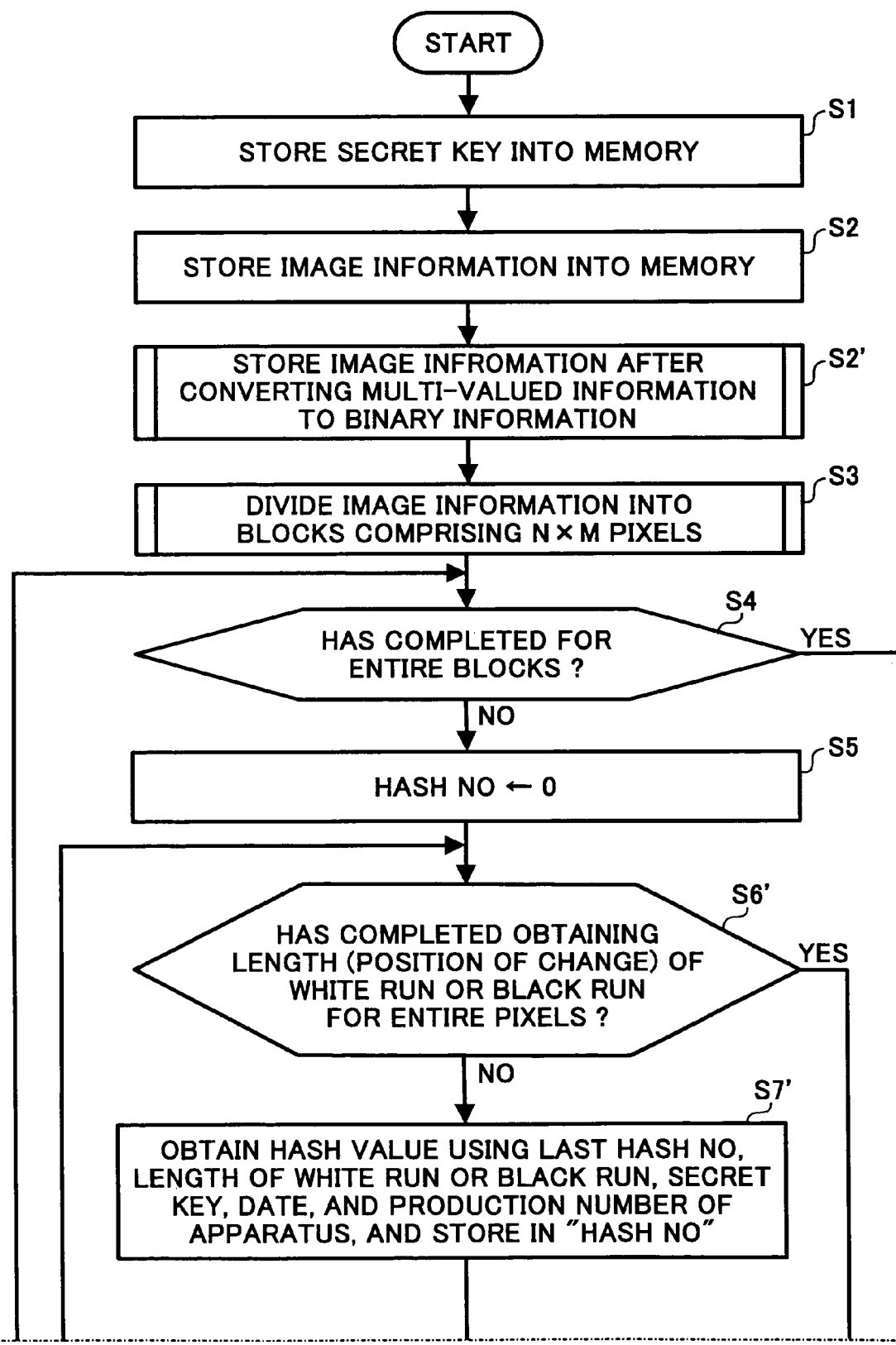
FIGS. 8A and 8B are flowcharts showing processing according to the second embodiment which divides an image into blocks, and embeds an electronic watermark.
Figure 8B:
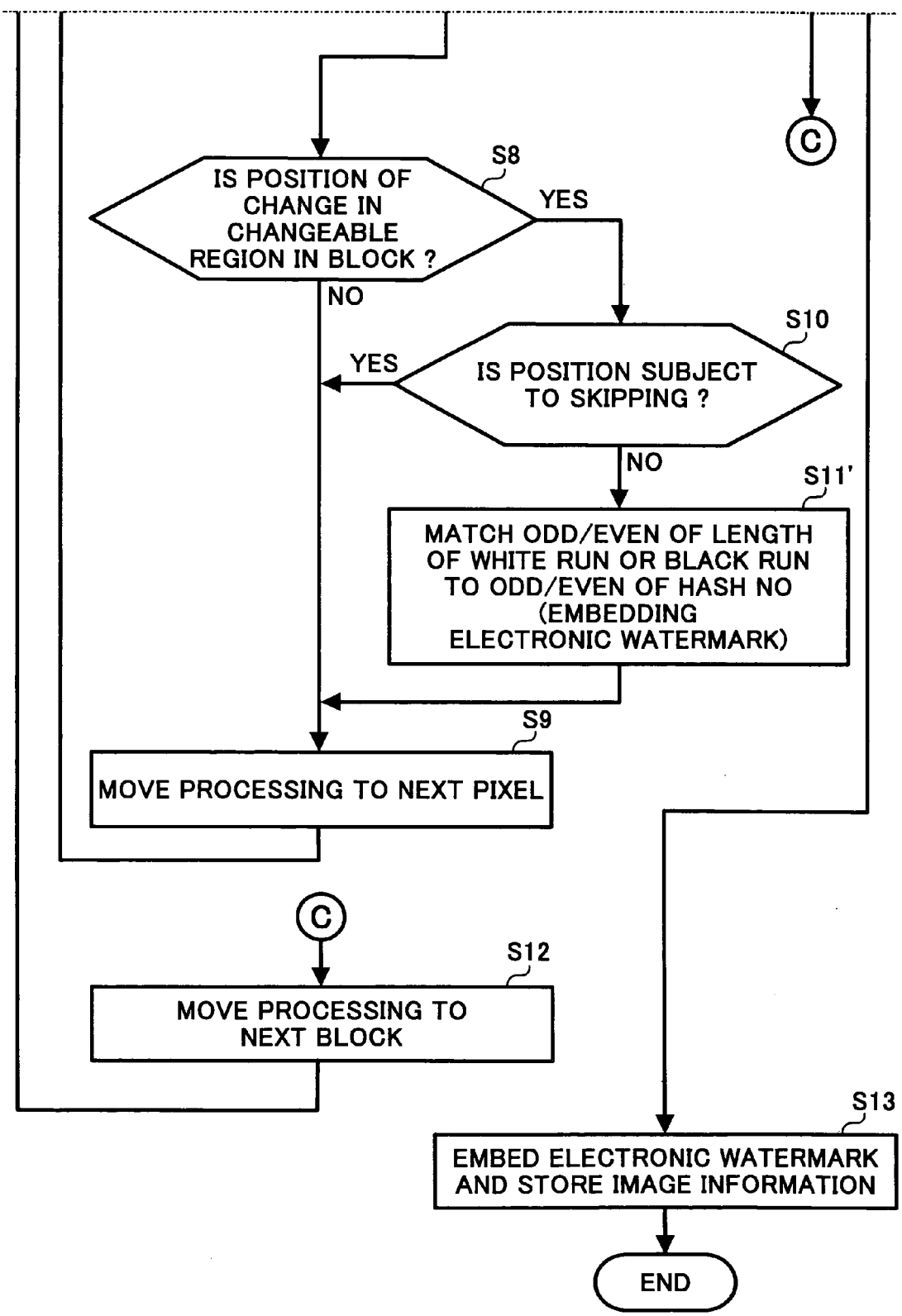

FIGS. 7A and 7B show an image formed by binarizing an image read by the imager 7, and a drawing which is an enlarged part of it, respectively. FIGS. 8A and 8B are flowcharts showing processing which is an encoding method for an electronic watermark according to the second embodiment, and divides an image into blocks when an electronic watermark is embedded into the image which is a digital content. The following section describes processing for embedding an electronic watermark into a binary image as an example. In FIGS. 8A and 8B, the same numerals are also assigned to constitution elements virtually having a similar function to the constitution elements described while referring to FIGS. 2A and 2B in the first embodiment.

The controller 1 stores an encryption key, which is entered from the operation entry unit 2 shown in FIG. 6, and is used for encryption for embedding an electronic watermark, into the memory 4 (S1). Also, the controller 1 stores image information taken by the imager 7 into the memory 4 (S2).

If the image information is a multi-valued image, the controller 1 obtains a binarization threshold using discriminant analysis in the multi-value/binary converter 17 (S2'). If the image information is a binary image, the controller 1 skips this processing. The controller 1 divides the image information into blocks with the same size comprising n×m pixels (S3). At this time, the controller 1 divides such that the block partially overlaps the upper, lower, left, and right blocks.

Then, the controller 1 checks whether the entire image information is divided into the blocks (S4), and if the processing for the entire blocks has not completed yet (No in S4), the controller initializes "HashNO" in which a hash value obtained using a hash function (S5).

The controller 1 checks successive white runs and black runs pixel by pixel from the upper left to the lower right in the same block, obtains the lengths (the positions of change) of the successive runs (rows), also checks whether the check has completed for the entire pixels (S6'), and if the processing has not completed (No in S6'), a new hash value is obtained while the last HashNO, the lengths of the white run and the black run of the pixels, the secret key, the date of the processing, and the production number of the apparatus are used as seeds for a hash function, and is stored in "Hash NO" (S7'). It is possible to select which item is selected from these seed data for the hash function (a combination of multiple items is possible).

The controller 1 determines whether the position of change in the run length in Step S6' is in a changeable region in the block (S8), and if the position is not in a changeable region (No in S8), the controller 1 moves to processing for the next pixel (a white run or a black run) (S9), and then returns to step S6'. If the position is in a changeable region (Yes in S8), the controller 1 checks whether the position of the pixel corresponds to a position subject to skipping (S10), and moves the processing to Step S9 if so (Yes in S10). This processing prevents an image degradation caused by embedding an electronic watermark. As the position for the skip, a position where a (multiple of a certain integer)th white or black run changes is set, for example.

If the position does not correspond to a position subject to skipping (No in S10) in Step S10, the controller 1 matches the odd/even of the length of the white run or the black run to the odd/even of "Hash NO" obtained in Step S7' (S11'). This step conducts the processing for embedding an electronic watermark, and then, the controller 1 moves to the processing of Step S9.

If the processing has completed for the entire pixels in the block in Step S6' (Yes in S6'), the controller 1 moves the processing to the next block (S12), and then, returns the processing to step S4. At this time, the selection of the block in the subject image information moves from the upper left to the lower right as of the run of the pixels.

If the controller 1 confirms that the processing for the entire blocks has completed in Step S4, the controller 1 records the image information including the embedded electronic watermark in the memory 4 or the recording medium (S13), and then, completes the processing.

Figure 9A:
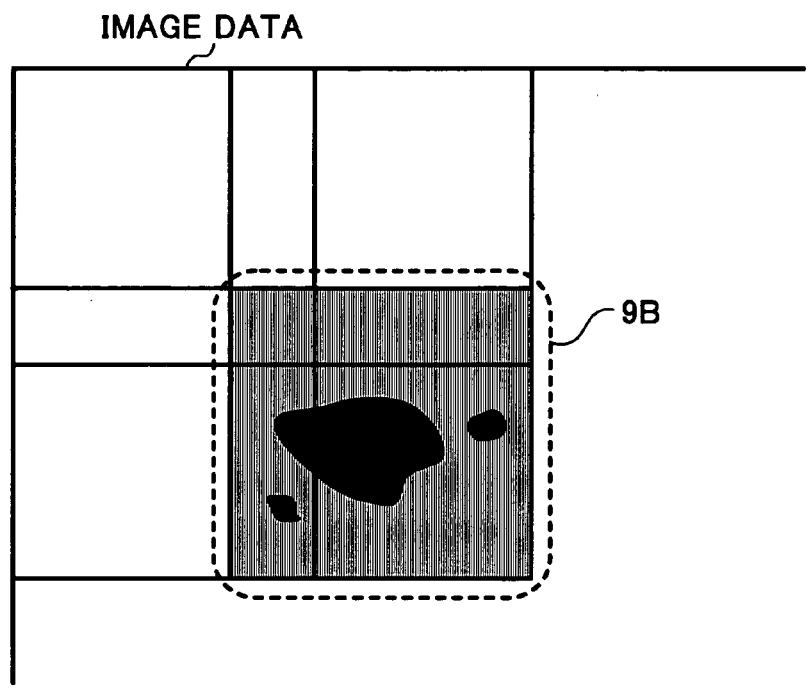
FIGS. 9A and 9B are views showing a relationship between the length of a white run (Lw) and the length of a black run (Lb) used for embedding an electronic watermark into a block in an original binary image, respectively.
Figure 9B:
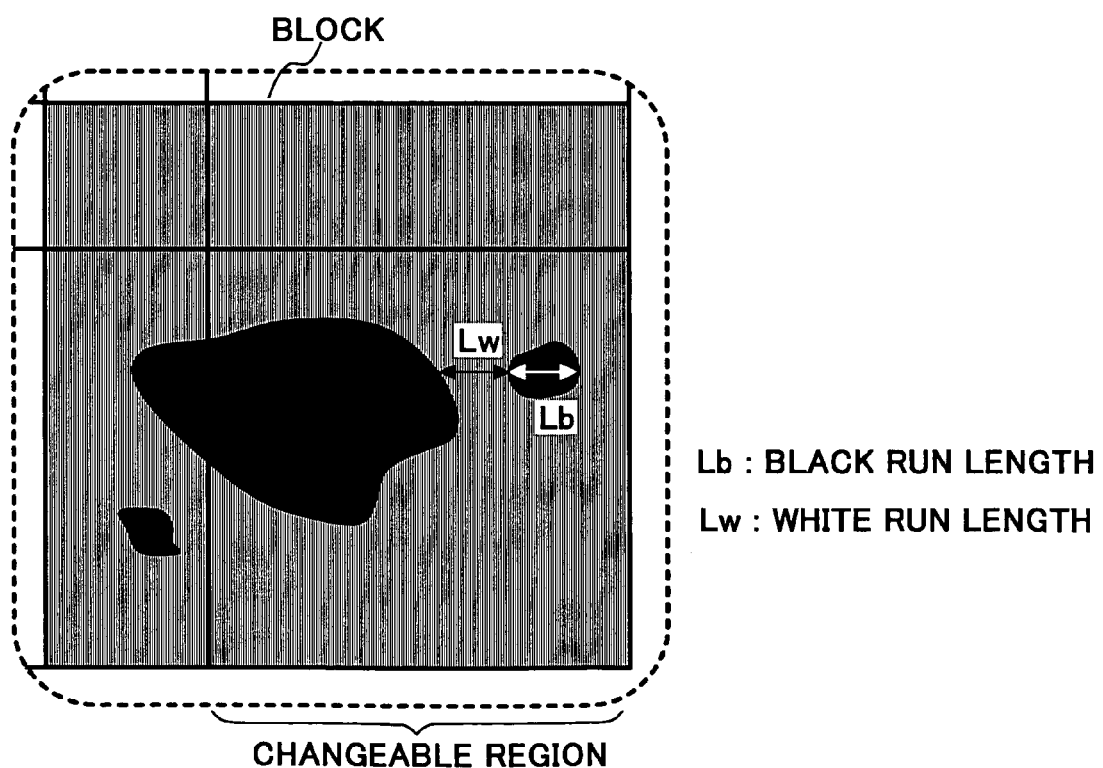

The following section describes an example of embedding an electronic watermark shown in Step S11' in FIG. 8B. FIGS. 9A and 9B show processing for embedding an electronic watermark into the length of a white run (Lw), and the length of a black run (Lb) in an original binary image, respectively. In this example, the controller 1 uses the length of a previous white run (Lw) or the like to change the length of a black run (Lb) in which an electronic watermark is embedded such that the odd/even of the length of the black run (Lb) matches the odd/even of the hash value obtained in Step S7'. Specifically, the controller 1 conducts processing for extending or contracting the pixel number of the black run (Lb) by ±1 so as to conduct the processing for embedding an electronic watermark. If the position of change for embedding the electronic watermark is not in the changeable region, or at a position subject to skipping, the controller 1 does not conduct the processing for embedding an electronic watermark.

Figure 10A:
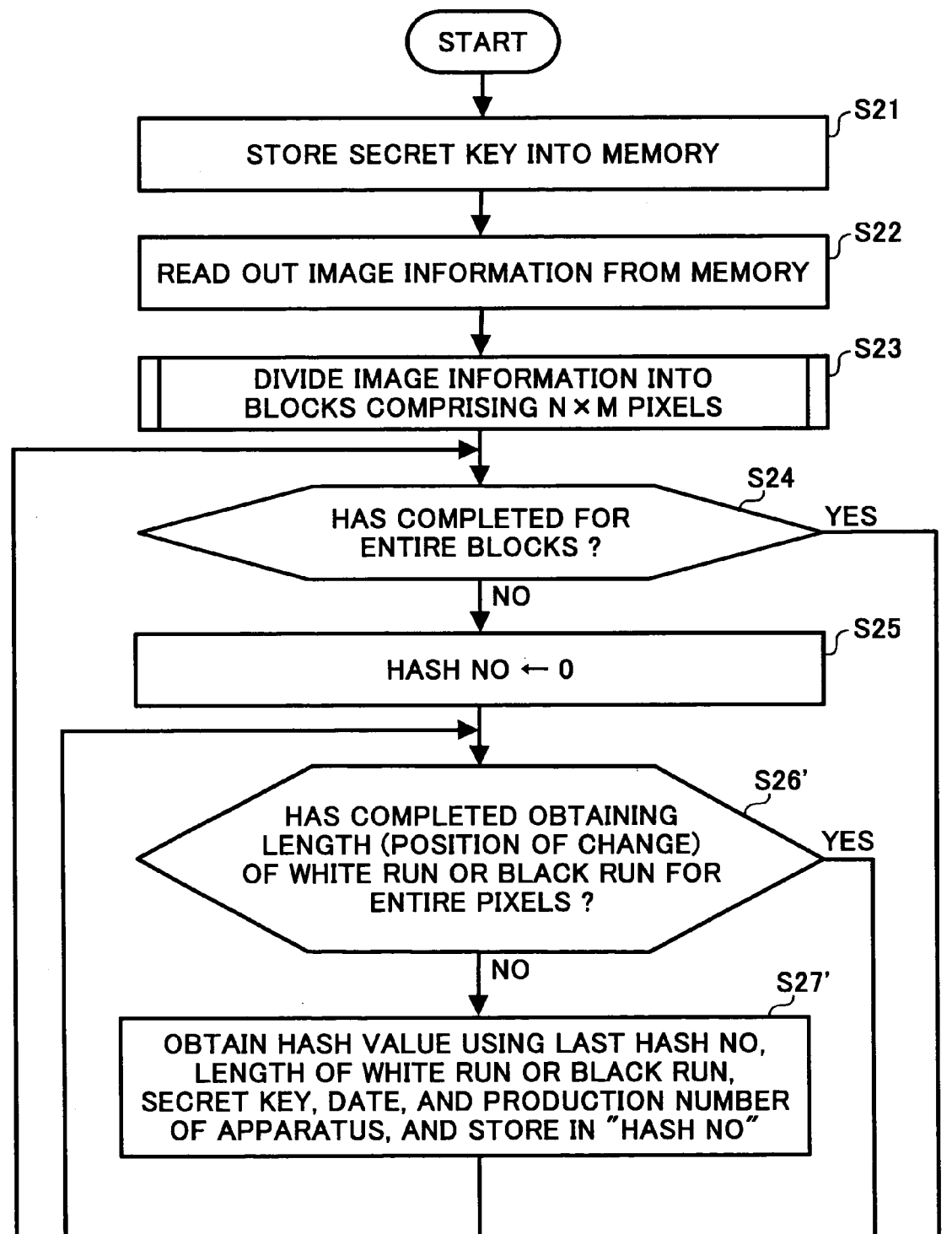
FIGS. 10A and 10B are flowcharts showing processing for reading an electronic watermark in an image, decoding it, and detecting tampering according to the second embodiment.
Figure 10B:
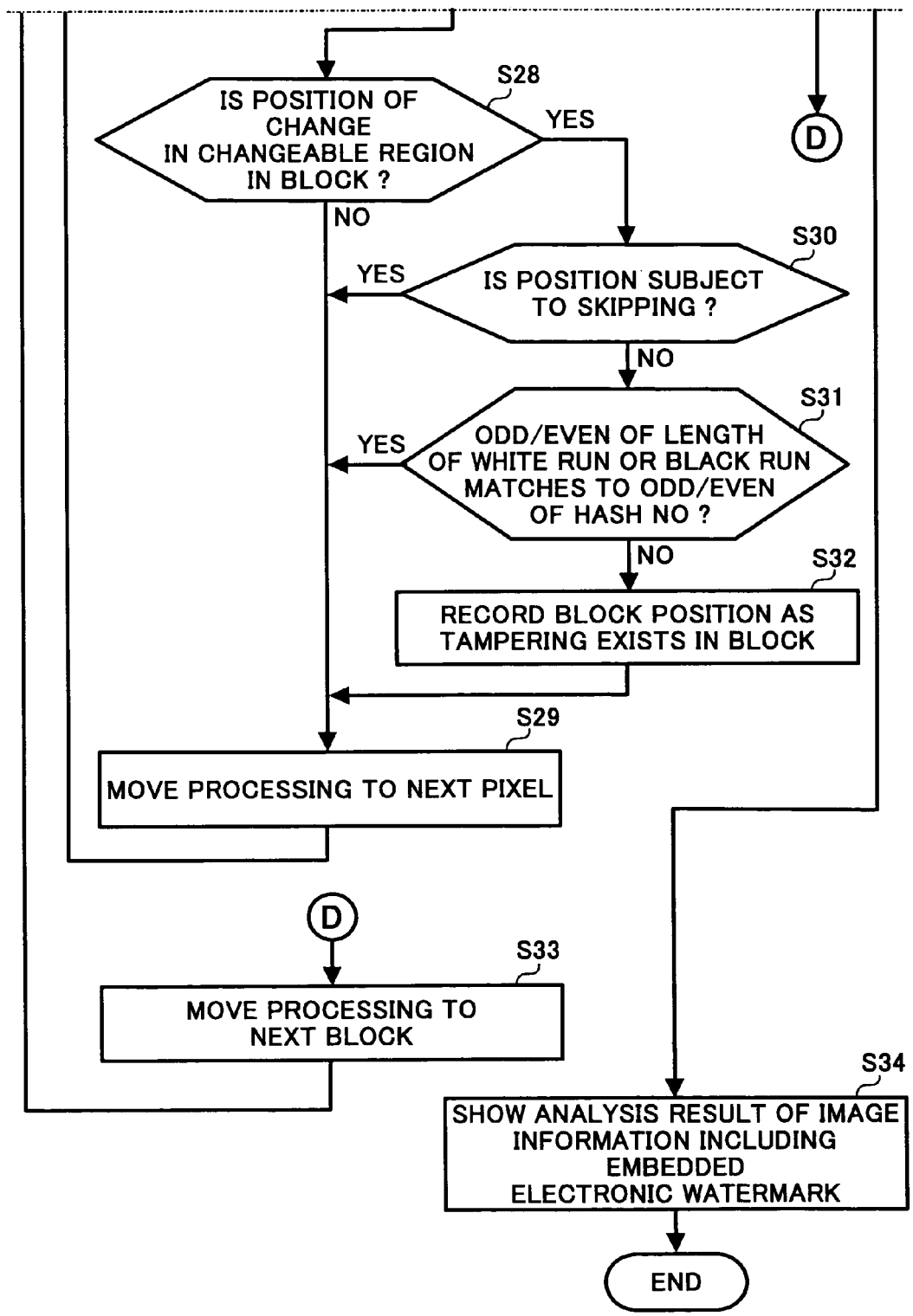

FIGS. 10A and 10B are flowcharts showing processing relating to the second embodiment, and shows processing for reading an electronic watermark, decoding it, and detecting tampering during reproducing an image. The flowcharts shown in FIGS. 10A and 10B conduct almost the same processing as is conducted by the flowcharts shown in FIGS. 5A and 5B, and differ in processing binary image instead of a multi-valued image.

In the flowchart in FIG. 10A, the controller 1 stores an entered encryption key (S21), and reads out image information including an embedded electronic watermark from the memory 4 (S22). At this time, when the image information is stored while it is compressed with MMR compression, the controller 1 uses MMR decompression to decode the image information. Further, the controller 1 divides the image information into blocks with the same size of n×m pixels (S23).

The controller 1 checks whether the entire image information is divided into blocks (S24), and if the entire image information has not been divided (No in S24), the controller 1 initializes "Hash NO" for storing the hash value (S25).

The controller 1 checks successive white runs and black runs pixel by pixel from the upper left to the lower right in the same block, and obtains the lengths (the positions of change) of the successive runs (rows). The controller 1 also checks whether the check has completed for the entire pixels (S26'), and if the processing has not completed (No in S26'), a new hash value is obtained while the last Hash NO, the lengths of the white run and the black run of the pixels, the secret key, the date of the processing, and the production number of the apparatus are used as seeds for a hash function, and is stored in "Hash NO" (S27').

The controller 1 determines whether the position of change in the length in Step S26' is in a changeable region in the block (S28), and if the position is not in a changeable region (No in S28), the controller 1 moves to processing for the next pixel (S29), and returns to Step S26'. If the position is in a changeable region (Yes in S28), the controller 1 checks whether the position of change in the length of the white run or the black run corresponds to a position subject to skipping (S30), and moves to Step S29 if so (Yes in S30).

If the position does not correspond to a position subject to skipping (No in S30) in Step S30, the controller 1 confirms that the odd/even of the length of the white run or the black run matches the odd/even of "Hash NO" obtained in Step S27' (S31'). With this processing, the controller 1 conducts the processing for confirming reproducibility of the embedded electronic watermark.

If the odd/even matches in Step S31' (Yes in S31'), the controller 1 determines that tampering does not exist, and moves the processing to Step S29. If the odd/even does not match (No in S31'), the controller 1 determines that there exists tampering, records the position of the corresponding block (S32), and moves to Step S29.

If the processing has completed for the entire pixels in the block in Step S26' (Yes in S26'), the controller 1 moves the processing to the next block (S33), and then, returns to Step S24. At this time, the selection of the block in the subject image information moves from the upper left to the lower right as of the run of the pixels.

If the controller confirms that the processing has completed for the entire blocks in Step S24 (Yes in S24), the controller 1 shows a result of analysis of the image information including the embedded electronic watermark (S34), and finishes the processing.

Figure 11A:
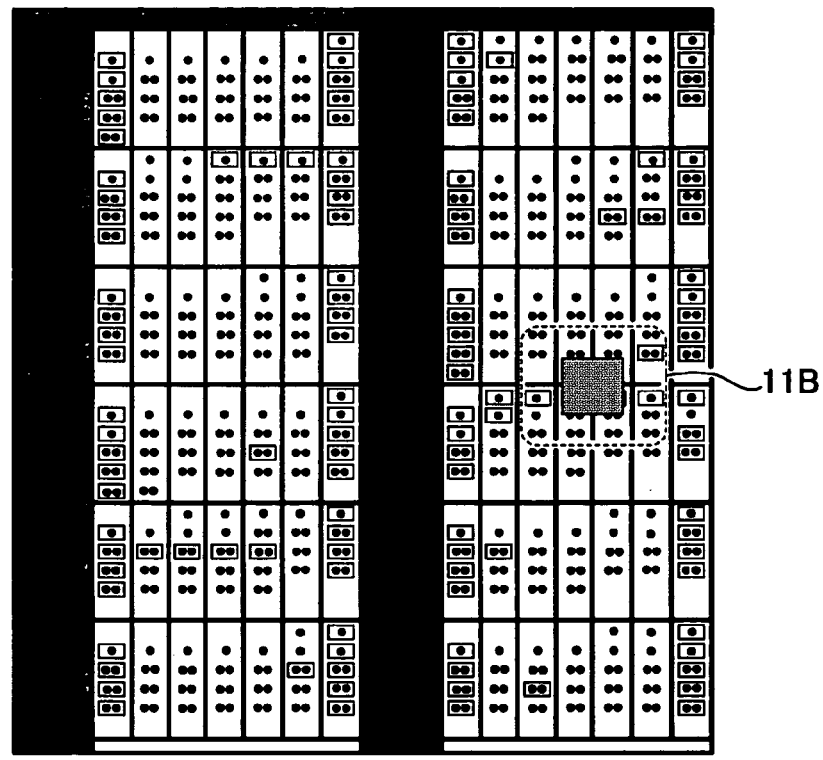
FIGS. 11A and 11B are views showing an example of an image where a corresponding block is inverted as a result of detecting tampering on the image, respective.
Figure 11B:
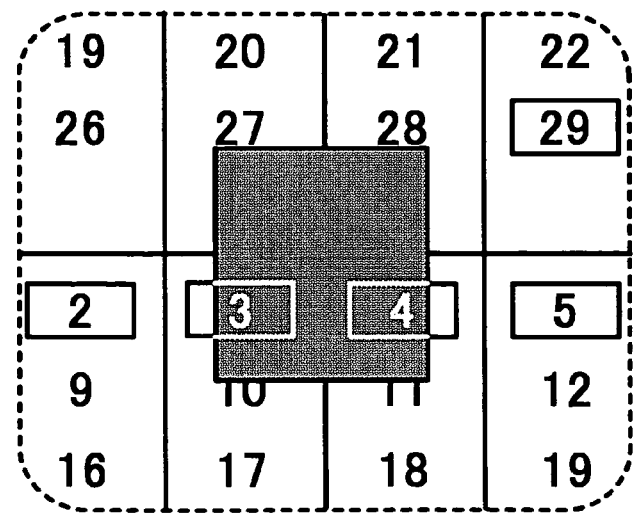

The controller 1 shows the block recorded in Step S32 as a color inversion, a black fill pattern, a white fill pattern, a color fill pattern other than the black and white fills, or the like on the display 13 based on this analysis result so as to inform the tampering. FIGS. 11A and 11B show an example of an image where processing for detecting tampering is conducted, and a corresponding block is inverted, respectively.

As described above, an existence of tampering a digital content is detected, and a tampered position is displayed while binary image information including an embedded electronic watermark is compressed with MMR and stored, the controller 1 reads and decodes the image information compressed with MMR, and checks the electronic watermark in the image information.

Figure 12:
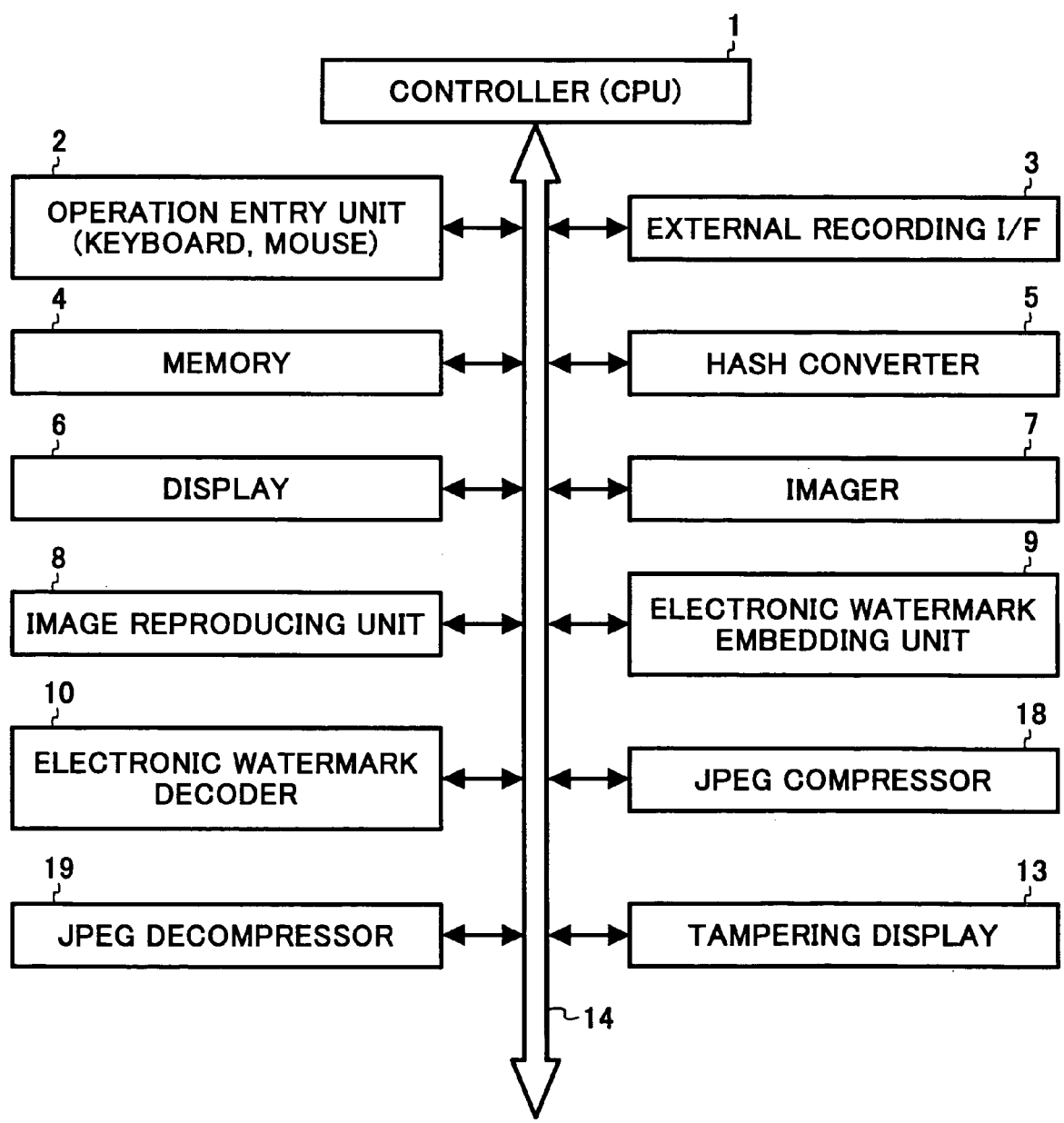
FIG. 12 is a block diagram showing a schematic constitution of an encoder/decoder for an electronic watermark of a third embodiment of the present invention.

FIG. 12 is a block diagram showing a schematic constitution of an encoder and a decoder for an electronic watermark according to a third embodiment of the present invention. When compared with the constitution in the block diagram shown in FIG. 1 of the first embodiment, the block diagram shown in FIG. 12 is different in a JPEG compressor 18 for compressing an image and storing it as an approximated image, and a JPEG decompressor 19 for decompressing an compressed image in place of the Loss-Less conversion compressor 11 and the Loss-Less conversion de-compressor 12 in the block diagram shown in FIG. 1.

The JPEG compressor 18 compresses with JPEG compression an image including an electronic watermark embedded by an electronic watermark embedding unit 9, and the JPEG de-compressor 19 decompresses to decode the JPEG-compressed image including the electronic watermark embedded by the JPEG compressor 18. These steps are conducted with prior art, and detail for them is not provided.

Figure 13:
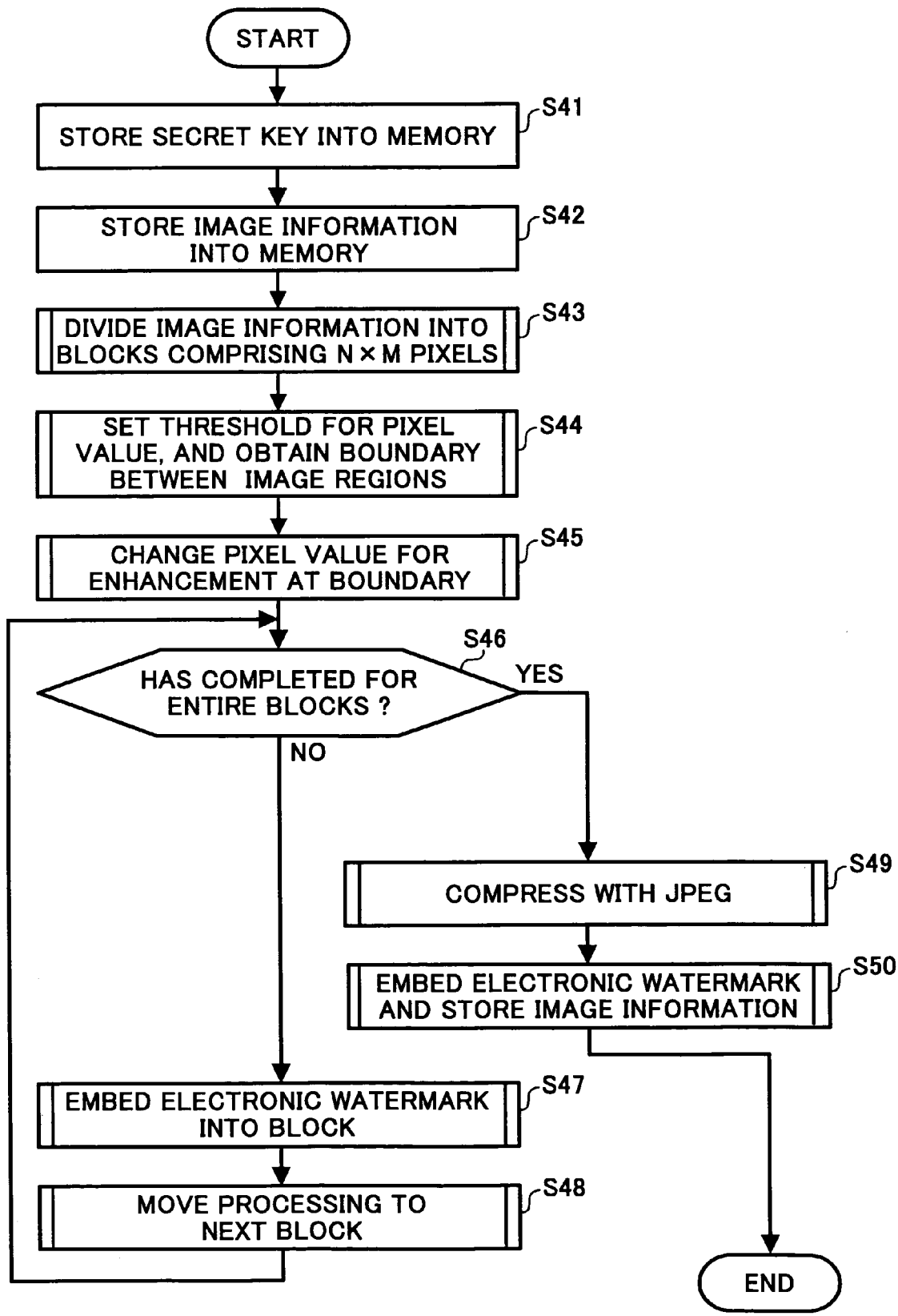
FIG. 13 is a flowchart showing according to the third embodiment; which divides an image into blocks, and embeds and electronic watermark.

FIG. 13 is a flowchart showing processing which is an encoding method for an electronic watermark according to the third embodiment, and divides an image into blocks when an electronic watermark is embedded into the image which is a digital content.

A controller 1 stores an entered encryption key (a secret key) for embedding an electronic watermark (S41). The controller 1 reads in a multi-valued image, which is image information for embedding an electronic watermark, and stores it into a memory 4 (S42). The controller 1 divides the image information into blocks with the same size comprising n×m pixels (S43). At this time, the controller 1 divides such that the block partially overlaps the upper, lower, left, and right blocks.

The controller 1 sets a threshold for a pixel value (such as a luminance value and a color difference value) of a pixel in the block, and compares the pixel value of the individual pixels with the threshold to obtain a boundary between two types of image regions based on the length (the position of change) of a successive run of the pixel values (such as a luminance value and a color difference value) of the pixel (S44). The controller 1 uses the average of pixel values in a block processed immediately before as this threshold, and selects and switches it according to the application.

The controller 1 changes the pixel value so as to increase the difference from the threshold at the obtained boundary (S45). Since an electronic watermark is embedded at the boundary where the density changes largely, a pixel value which is larger or smaller than the threshold by several pixel values in density is enhanced. For example, a pixel value larger than the threshold is set to the white side, and a pixel value smaller than the threshold is set to the black side.

The controller 1 checks whether the processing for the entire divided blocks has completed (S46), if the processing for the entire divided blocks has not completed (No in S46), the controller 1 embeds an electronic watermark in the block (S47), when Step S47 ends, the controller 1 moves the processing to the next block (S48), and the controller 1 returns to Step S46. When the processing for the entire blocks has completed (Yes in S46), the JPEG compressor conducts compressing (S49) so as to store the image information including the embedded electronic watermark.

Figure 14:
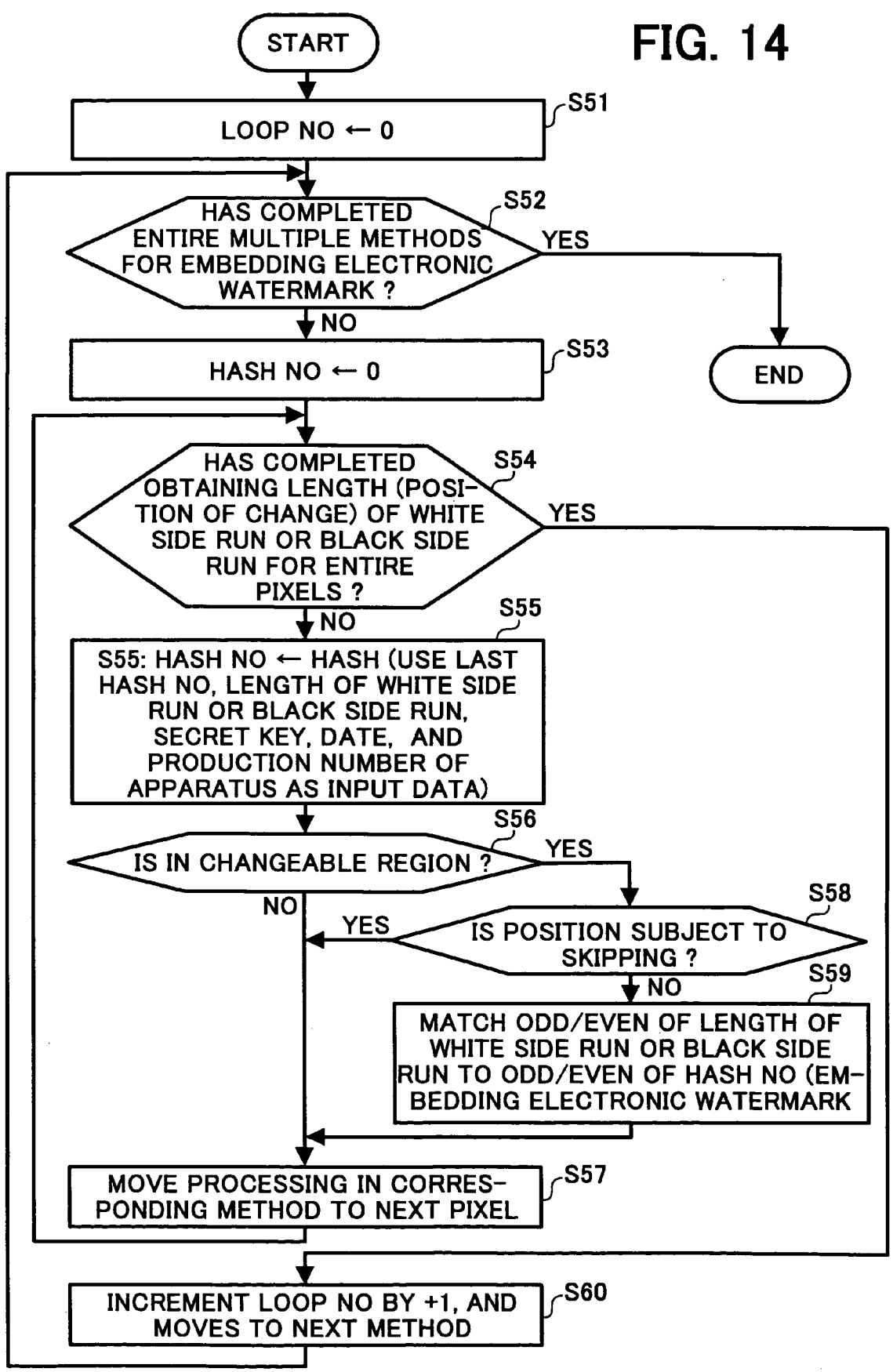
FIG. 14 is a flowchart showing processing for embedding an electronic watermark in the block according to the third embodiment.

FIG. 14 is a flowchart showing embedding an electronic watermark in a block according to the third embodiment. Embedding an electronic watermark is repeated using independent multiple processing methods in Step S47 in FIG. 13 such that the image information including the embedded electronic watermark withstands degradation of the image quality when the JPEG compression and the like are conducted.

The controller 1 initializes "Loop NO" which records the number of repeating processing for the multiple methods for embedding an electronic watermark (S51), and checks whether the embedding an electronic watermark has repeated for predetermined times set as embedding an electronic watermark (S52). When the processing has not repeated for the specified times (No in S52), the controller 1 initializes "Hash NO" for storing a hash value (S53).

The controller 1 checks the pixel values from the upper left to the lower right pixel by pixel in the same block, obtains the length (the position of change) of the run of the pixel values (the white side or the black side) of the pixel. The controller 1 also checks whether the check has completed for the entire pixels (S54), and if the processing has not completed (No in S54), a new hash value is obtained while the last Hash NO, the lengths of the run of the pixel values (the white side or the black side) of the pixel, the secret key, the date of the processing, and the production number of the apparatus are used as seeds for a hash function, and is stored in "Hash NO" (S55). It is possible to select arbitrary data (such as a combination of multiple data) from these seed data for the hash function.

The controller 1 determines whether the position of change in the run length on the white side or the black side in Step S55 is in a changeable region in the block (S56), and if the position is not in a changeable region (No in S56), the controller 1 moves to processing for the next pixel (S57), and then returns to Step S54. If the position is in a changeable region (Yes in S56), the controller 1 checks whether the position of the pixel corresponds to a position subject to skipping (S58), and moves to Step S57 if so (Yes in S58).

If the position does not correspond to a position subject to skipping (No in S58) in Step S58, the controller 1 matches the odd/even of the length of the run at the position of change to the odd/even of "Hash NO" obtained in Step S55 (S59). The value on the side toward which the change should be conducted is copied to the pixel for matching in odd/even so as to embed an electronic watermark. Then, the controller 1 moves the processing to the processing of Step S57.

If the processing has completed for the entire pixels in the block in Step S54 (Yes in S54), the controller 1 adds one to "Loop NO", moves to the next method for embedding an electronic watermark (S60), and returns to Step S52. The controller 1 conducts a similar processing for a new pixel value of the pixel, and if the controller 1 has completed the processing methods for different individual pixel values (such as a density value and a color difference value), moves to Step S48 in the flowchart in FIG. 13, repeats the processing for the next block, and conducts the processing for the entire divided blocks.

FIG. 15 is a flowchart showing processing for reading in an electronic watermark, decoding it, and detecting tampering during reproducing an image in the third embodiment. First, the controller 1 stores an entered encryption key (a secret key) for embedding an electronic watermark (S61). The controller 1 also reads out the image information including an embedded electronic watermark (S62), and decompress the compressed image information (S63). Further, the controller 1 divides the image information into blocks with the same size comprising n×m pixels (S64). At this time, the controller 1 divides such that the block partially overlaps the upper, lower, left, and right_blocks.

The controller 1 sets a threshold for a pixel value (such as a luminance value and a color difference value) of the pixel in the block, and compares with the threshold to obtain a boundary between two types of image regions based on the length (the position of change) of a successive run of the pixel values (such as a luminance value and a color difference value) of the pixel (S65). The controller 1 checks whether the processing for the entire divided blocks has completed (S66), when the processing for the entire blocks has not completed (No in S66), the controller 1 reads out an electronic watermark in the block, decodes it, and determines an existence of tampering (S67), and the controller 1 moves the processing to the next block when Step S67 is completed (S68), and returns to Step S66. If the processing has completed for the entire blocks (Yes in S66), the controller 1 shows a result of analyzing the image information including the embedded electronic watermark (S69).

Figure 16A:
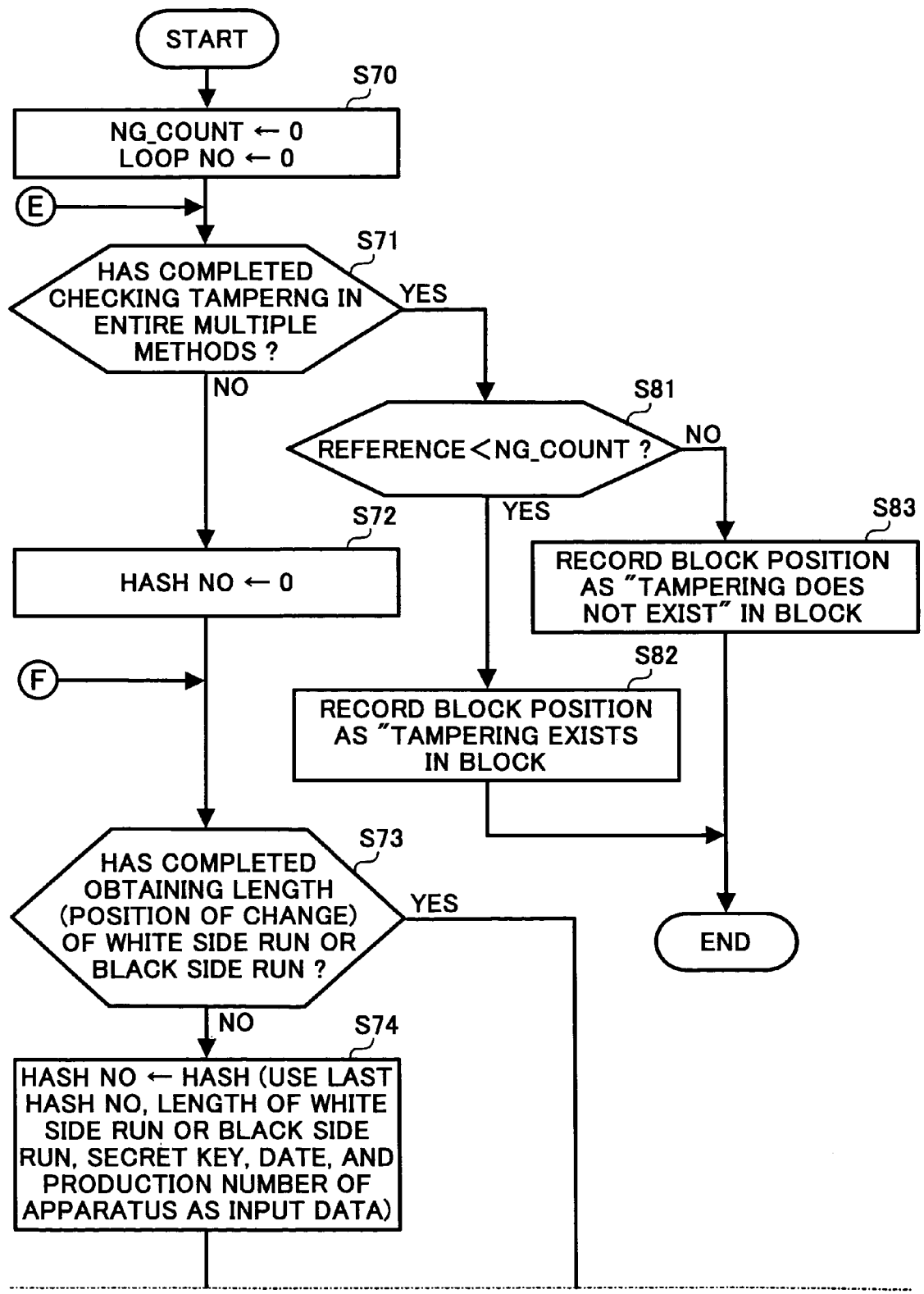
FIGS. 16A and 16B are flowcharts showing processing for reading an electronic watermark in the block, decoding it, and determining an existence of tampering according to the third embodiment.
Figure 16B:
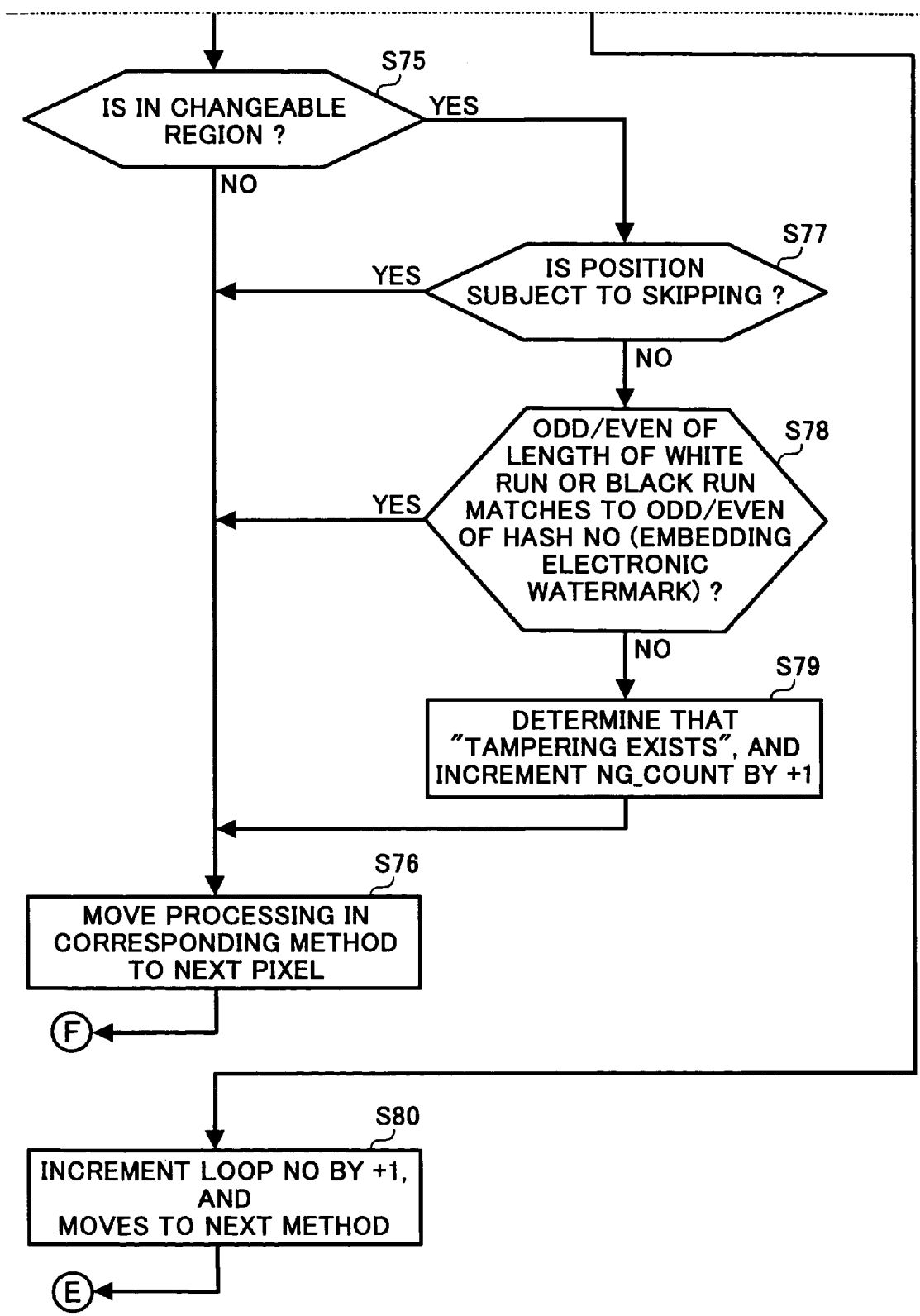

Then, FIGS. 16A and 16B are flowcharts showing processing for reading out the electronic watermark in the block, decoding it, and determining an existence of tampering according to the third embodiment. In Step S67 in FIG. 15, the electronic watermark is read out and decoded with the independent multiple processing methods.

Since reading out and decoding the electronic watermark is repeated for the multiple methods, the controller 1 initializes "Loop NO" for recording the number of the processing methods and "NG#Count" for recording a count of detected abnormalities (S70). Then, the controller 1 checks whether the multiple types of processing conducted as embedding an electronic watermark have conducted (S71), and if the count of the conducted types of the processing is not the total of the multiple types of the processing (No in S71), the controller 1 initializes "Hash NO" for storing a hash value obtained by the hash function (S72).

The controller 1 checks the pixel values from the upper left to the lower right pixel by pixel in the same block, obtains the length (the position of change) of the white side run or the black side run of the successive pixel values of the pixel, and also checks whether the check has completed for the entire pixels (S73). If the processing has not completed for the entire pixels (No in S73), the controller 1 obtains a new hash value while the last Hash NO, the lengths of the run of the pixel values (the white side or the black side) of the pixel, the secret key, the date of the processing, and the production number of the apparatus are used as seed data for a hash function, and stores it in "Hash NO" (S74).

The controller 1 determines whether the position of change in the run length in Step S73 is in a changeable region in the block (S75), and if the position is not in a changeable region (No in S75), the controller 1 moves to processing in the corresponding method for the next pixel (S76), and then returns to Step S73. If the position is in a changeable region (Yes in S75), the controller 1 checks whether the position of the pixel corresponds to a position subject to skipping (S77), and moves to Step S76 if so (Yes in S77).

If the position does not correspond to a position subject to skipping (No in S77) in Step S77, the controller 1 checks the odd/even of the length of the run of the pixel at the position of change based on the odd/even of "Hash NO" obtained in Step S74 (S78). If the match of the odd/even is confirmed (Yes in S78), the controller 1 determines that the image was not tampered, and moves to Step S76. If a mismatch of the odd/even is detected (No in S78), the controller 1 determines that the image was tampered, adds 1 to "NG#Count", and moves to Step S76.

If the processing has completed for the entire pixels in the block in Step S73 (Yes in S73), the controller 1 adds 1 to "Loop NO", switches to a new method for reading out an electronic watermark (S80), and returns to Step S71. Similar processing is applied to a pixel value of the pixels in the new method, if the entire processing methods for the specified different pixel values (such as a density value and a color difference value) have completed (Yes in S71), the controller 1 checks whether "NG#Count" recording the number of abnormalities is larger than a reference (S81), and if it is larger (Yes in S81), the controller 1 determines that the corresponding block was tampered, records the position of the block (S82), and moves to Step S68 in FIG. 15. If "NG#Count" is smaller in S81 (No in S81), the controller 1 determines that the corresponding block was not tampered, records the position of the block (S83), and returns to Step S68 in FIG. 15 in the same way.

Consequently, when image information including an embedded electronic watermark is compressed with Lossy compression, is stored, and is reproduced, an existence of tampering of an digital content compressed with the Lossy compression is detected based on decision by majority in terms of results of reading out and decoding the electronic watermark in the decoded image information in multiple methods.

As described above, when the present invention is integrated into a digital camera and the like, since an electronic watermark is directly embedded into multi-valued or binary image information pictured and recorded, the image information is non-compressed, Loss-Less-compressed, or Lossy-compressed, and is stored, the embedded electronic watermark during the imaging is reproduced in a similar state, and tampering is detected and a block at a corresponding position is limited by checking this electronic watermark, the present invention provides such an effect that an image pictured by the digital camera can be used as an photographic evidence.

What is claimed is:

1. An encoder for forming electronic watermark information which detects tampering in a digital content, and limits a part of said tampering based on said electronic watermark embedded in said digital content, comprising:

means for dividing a subject digital content into multiple blocks;

means for independently forming electronic watermark information in the individual blocks;

means for dividing the blocks to be divided such that a region of the block overlaps blocks neighboring on the upper, lower, left, and right sides in place of said means for dividing said digital content into multiple blocks; and means for associating the electronic watermark information formed by the means for independently forming electronic watermark information in the individual blocks with each other by means of the overlap region between said blocks, said electronic watermark being formed so as to detect an exchange between said blocks as tampering.

2. The encoder for electronic watermark according to claim 1 further comprising means for arbitrarily changing the size of the multiple divided blocks, and the overlap regions between the blocks in place of the means for dividing said digital content into multiple blocks.

3. The encoder for electronic watermark according to claim 1, wherein the means for independently forming electronic watermark information in said blocks forms said electronic watermark information by means of a hash function (randomizing) which uses plurality of data of a digital content embedded with an electronic watermark immediately before, a secret key, the date of executing the process and an apparatus production number as seed data.

4. The encoder for electronic watermark according to claim 3, wherein the number of successive pixels in individual regions of the digital content embedded with a digital watermark immediately before is used as the data of the digital content embedded with a digital watermark immediately before used as said seed data for the hash function (randomizing).

5. The encoder for electronic watermark according to claim 3, wherein odd/even of a pixel value of individual pixels in a multi-valued image of the digital content is matched using odd/even of an integer of a result of the randomizing by said hash function (randomizing) used for said means for forming electronic watermark information.

6. The encoder for electronic watermark according to claim 3, wherein odd/even of the number of successive pixels in individual regions in a binary image of the digital content is matched using odd/even of an integer of a result of the randomizing by said hash function (randomizing) used for said means for forming electronic watermark information.

7. The encoder for electronic watermark according to claim 3, wherein regions are formed based on a threshold for pixel values of individual pixels in a multi-valued image of the digital content, and odd/even of the number of successive pixels in the individual regions is matched using odd/even of an integer of a result of the randomizing of said hash function (randomizing) used for said means for forming electronic watermark information.

8. The encoder for electronic watermark according to claim 1 further comprising means for embedding said electronic watermark while positions for applying an electronic watermark are skipped in said digital content so as to restrain said digital content from degrading.

9. The encoder for electronic watermark according to claim 1 further comprising:

means for skipping positions for applying said electronic watermark in said digital content; and means for embedding said electronic watermark at a boundary between successive pixels in said digital content, wherein said digital content is restrained from degrading.

10. The encoder for electronic watermark according to claim 9, wherein means for arbitrarily changing the positions for skipping said electronic watermark is added to said means for skipping positions for applying the electronic watermark in said digital content.

11. An encoder for electronic watermark, wherein information indicating that said electronic watermark is embedded is recorded in a file header of said digital content when said digital content with said embedded electronic watermark is created by the encoder for electronic watermark according to claim 1, and then is recorded on a recording medium.

12. An encoder for electronic watermark, wherein the encoder for electronic watermark according to claim 1 is added to a digital camera, a subject is pictured as a digital content by imaging means, and the digital content is recorded on a recording medium while said electronic watermark is embedded.

13. A decoder for electronic watermark for reading out and decoding the electronic watermark embedded in a digital content by the encoder for electronic watermark according to claim 1, comprising:
  means for reading out the electronic watermark information individually formed for multiple divided blocks;
  means for decoding said electronic watermark information;
  means for detecting an existence of a tampered part in said digital content based on the result from said decoding means; and
  means for showing a block including said tampered part detected by said means for detecting an existence of a tampered part in the digital content as a color inversion pattern, a black fill pattern, a white fill pattern, or a color fill pattern other than the black and white fills, so as to visually identify the tampered part.

14. An encoding method for electronic watermark for forming electronic watermark information which detects tampering in a digital content, and limits a part of said tampering based on said electronic watermark embedded in said digital content, comprising the steps of:
  dividing a subject digital content into multiple blocks;
  independently forming electronic watermark information in the individual blocks;
  dividing the blocks to be divided such that a region of the block overlaps blocks neighboring on the upper, lower, left, and right sides corresponding to the means for dividing the digital content into multiple blocks; and
  associating the electronic watermark information formed by the means for independently forming electronic watermark information in the individual blocks with each other by means of the overlap region between said blocks,
  said electronic watermark being formed so as to detect an exchange between said blocks as tampering.

15. The encoding method for electronic watermark according to claim 14 further comprising the step of arbitrarily changing the size of the multiple divided blocks, and the overlap region between the blocks so as to divide said blocks into arbitrary sizes when said digital content is divided into multiple blocks.

16. The encoding method for electronic watermark according to claim 14, wherein the electronic watermark information is independently formed in said blocks by means of a hash function (randomizing) while plurality of data of a digital content embedded with an electronic watermark immediately before, a secret key, the data of executing the process, and an apparatus production number, are used as seed data.

17. The encoding method for electronic watermark according to claim 16, wherein the number of successive pixels in individual regions of the digital content embedded with a digital watermark immediately before is used as the data of the digital content embedded with a digital watermark immediately before used as said seed data for the hash function (randomizing).

18. The encoding method for electronic watermark according to claim 16, wherein odd/even of a pixel value of individual pixels in a multi-valued image of the digital content is matched using odd/even of an integer of a result of the randomizing by said hash function (randomizing) used for said means for forming electronic watermark information.

19. The encoding method for electronic watermark according to claim 16, wherein odd/even of the number of successive pixels in individual regions in a binary image of the digital content is matched using odd/even of an integer of a result of the randomizing by said hash function (randomizing) used for said means for forming electronic watermark information.

20. The encoding method for electronic watermark according to claim 16, wherein regions are formed based on a threshold for pixel values of individual pixels in a multi-valued image of the digital content, and odd/even of the number of successive pixels in the individual regions is matched using odd/even of an integer of a result of the randomizing of said hash function (randomizing) used for said means for forming electronic watermark information.

21. The encoding method for electronic watermark according to claim 14 further comprising the step of embedding said electronic watermark while positions for applying an electronic watermark are skipped in said digital content so as to restrain said digital content from degrading.

22. The encoding method for electronic watermark according to claim 14 further comprising the steps of:
  skipping positions for applying said electronic watermark in said digital content; and
  embedding said electronic watermark at a boundary between successive pixels in said digital content,
  wherein said digital content is restrained from degrading.

23. The encoding method for electronic watermark according to claim 21, wherein arbitrarily changing the positions for embedding the electronic watermark by skipping positions for applying said electronic watermark in said digital content arbitrarily selects a range of degradation of said digital content.

24. An encoding method for electronic watermark, wherein information indicating that an electronic watermark is embedded is recorded in a file header of the digital content when said digital content with the embedded electronic watermark is created by the encoding method for electronic watermark according to claim 14, and then the digital content is recorded on a recording medium.

25. A decoding method for electronic watermark for reading out and decoding the electronic watermark embedded in a digital content by the encoding method for electronic watermark according to claim 14, comprising the steps of:
  reading out the electronic watermark information individually for the multiple divided blocks;
  decoding said electronic watermark information;
  detecting an existence of a tampered part in said digital content;
  showing a block including said tampered part detected based on reading out; and
  decoding the electronic watermark information in said digital content as a color inversion pattern, a black fill pattern, a white fill pattern, or a color fill other than the black and white fills, so as to visually identify the tampered part.

26. A computer program product storing program instructions for encoding to form electronic watermark information which detects tampering in a digital content, and limits a part of said tampering based on said electronic watermark embedded in said digital content, and for decoding said electronic watermark for showing a tampered part when said tampered part is detected, which when executed by an information processing apparatus, result in said information processing apparatus performing steps comprising:

dividing a subject digital content into multiple blocks;
independently forming electronic watermark information in the individual blocks;
reading out the electronic watermark information individually for the multiple divided blocks; and
decoding said electronic watermark information, and then said information processing apparatus detects a tempered part, limits said tampered part to a block, and shows the tampered part for the individual blocks.

27. The computer program product according to claim 26, wherein said program instructions result in said information processing apparatus performing further steps comprising:

dividing the blocks to be divided such that a region of the blocks overlaps blocks neighboring on the upper, lower, left, and right sides; and
associating the electronic watermark information formed by the independently forming electronic watermark information in the individual blocks with each other by means of the overlap region between said blocks when said dividing a subject digital content into multiple blocks is performed, and forms said electronic watermark so as to detect an exchange between said blocks as tampering.

28. The computer program product according to claim 27, wherein said program instructions result in said information processing apparatus performing further steps comprising:

arbitrarily changing the size of the multiple divided blocks, and the overlap region between the blocks when the dividing said digital content into multiple blocks is performed.

29. The computer program product according to claim 26, wherein said program instructions result in said information processing apparatus performing a further step of independently forming electronic watermark information in said blocks to form said electronic watermark information by means of a hash function (randomizing) which uses plurality of data of a digital content embedded with an electronic watermark immediately before, a secret key, the data of executing the process, and an apparatus production number, as seed data.

30. The computer program product according to claim 29, wherein the number of successive pixels in individual regions of the digital content embedded with a digital watermark immediately before is used as the data of the digital content embedded with a digital watermark immediately before used as said seed data for the hash function (randomizing).

31. The computer program product according to claim 29, wherein odd/even of a pixel value of individual pixels in a multi-valued image of the digital content is matched using odd/even of an integer of a result of the randomizing by said hash function (randomizing) used when said forming electronic watermark information is performed by said information processing apparatus.

32. The computer program product according to claim 29, wherein odd/even of the number of successive pixels in individual regions in a binary image of the digital content is matched using odd/even of an integer of a result of the randomizing by said hash function (randomizing) used when said forming electronic watermark information is performed by said information processing apparatus.

33. The computer program product according to claim 29, wherein regions are formed based on a threshold for pixel values of individual pixels in a multi-valued image of the digital content, and odd/even of the number of successive pixels in the individual regions is matched using odd/even of an integer of a result of the randomizing of said hash function (randomizing) used when said forming electronic watermark information is performed by said information processing apparatus.

34. The computer program product according to claim 26, wherein said program instructions result in said information processing apparatus performing a further step of embedding said electronic watermark while positions for applying an electronic watermark are skipped in said digital content so as to restrain said digital content from degrading.

35. The computer program product according to claim 34, wherein said program instructions result in said information processing apparatus performing a further step of arbitrarily changing the positions for skipping the electronic watermark in the skipping positions for applying said electronic watermark in said digital content so as to select a range of degradation of said digital content.

36. The computer program product according to claim 26, wherein said program instructions result in said information processing apparatus performing further steps comprising:

skipping positions for applying said electronic watermark in said digital content; and
embedding said electronic watermark at a boundary between successive pixels in said digital content, and said digital content is restrained from degrading.

37. The computer program product according to claim 26, wherein said program instructions result in said information processing apparatus performing further steps comprising:

detecting a tampered part in the digital content based on said decoded electronic watermark information; and
showing a block including said tampered part as a color inversion pattern, a black fill pattern, a white fill pattern, or a color fill pattern other than the black and white fills so as to visually identify the tampered part when said information processing apparatus performs the decoding said electronic watermark information.

38. A recording medium for recording the program instructions stored in the computer program product according to claim 26 as to be readable for functioning on an information processing apparatus.

* * * * *